(12) United States Patent
Ichimura

(10) Patent No.: US 7,031,233 B2
(45) Date of Patent: Apr. 18, 2006

(54) OPTICAL RECORDING/REPRODUCTION DEVICE AND FOCAL POINT CONTROL METHOD

(75) Inventor: Isao Ichimura, Tokyo (JP)

(73) Assignee: Sony Corporation, Tokyo (JP)

( * ) Notice: Subject to any disclaimer, the term of this patent is extended or adjusted under 35 U.S.C. 154(b) by 101 days.

(21) Appl. No.: 10/487,051

(22) PCT Filed: Jul. 3, 2003

(86) PCT No.: PCT/JP03/08499

§ 371 (c)(1),
(2), (4) Date: Feb. 18, 2004

(87) PCT Pub. No.: WO2004/006232

PCT Pub. Date: Jan. 15, 2004

(65) Prior Publication Data

US 2004/0207944 A1    Oct. 21, 2004

(30) Foreign Application Priority Data

Jul. 4, 2002    (JP) .............................. 2002-195745

(51) Int. Cl.
G11B 7/00    (2006.01)
G11B 7/085   (2006.01)
G11B 7/125   (2006.01)

(52) U.S. Cl. .............................. 369/44.11; 369/53.23; 369/53.28

(58) Field of Classification Search ............. 369/44.23, 369/44.25, 44.26, 44.32, 44.27, 44.28, 53.22, 369/53.28
See application file for complete search history.

(56) References Cited

U.S. PATENT DOCUMENTS

| 5,189,293 | A | * | 2/1993 | Leenknegt | ............... | 250/201.5 |
| 6,061,310 | A | * | 5/2000 | Iida | ......................... | 369/44.27 |
| 6,101,157 | A | * | 8/2000 | Bradshaw et al. | ........ | 369/44.35 |
| 6,246,646 | B1 | * | 6/2001 | Abe et al. | ................. | 369/44.27 |
| 6,324,133 | B1 | * | 11/2001 | Ichimura | ................. | 369/44.27 |
| 6,434,094 | B1 | * | 8/2002 | Yamada et al. | .......... | 369/44.26 |
| 6,756,574 | B1 | * | 6/2004 | Higuchi | ................... | 250/201.2 |
| 2002/0054554 | A1 | * | 5/2002 | Yamanaka | ............... | 369/53.19 |
| 2002/0159342 | A1 | * | 10/2002 | Ogasawara et al. | ...... | 369/44.23 |

FOREIGN PATENT DOCUMENTS

| JP | 10-188301 | 7/1998 |
| JP | 2002-100061 | 4/2002 |
| JP | 2002-157750 | 5/2002 |

* cited by examiner

*Primary Examiner*—William Klimowicz
*Assistant Examiner*—Nathan Danielsen
(74) *Attorney, Agent, or Firm*—Oblon, Spivak, McClelland, Maier & Neustadt, P.C.

(57) ABSTRACT

An optical recording/playback apparatus of the present invention achieves proper focus control on a target recording layer of a single-layer disk or a multilayer disk. When the focus control is performed on the target information-recording layer of a recording medium, spherical-aberration compensation is first adjusted with respect to the thickness of a transmissive protection layer (cover layer) for the target information-recording layer. Alternatively, the adjustment may be made with respect to the average thickness of transmissive protection layers for the corresponding multiple information-recording layers. An objective lens is then moved along the optical axis to perform a focus-searching operation. In that case, the polarity of a focusing error signal and the level of a reflected-beam intensity signal generated as reflected-beam information are observed so as to perform the focusing operation.

20 Claims, 17 Drawing Sheets

FIG. 6
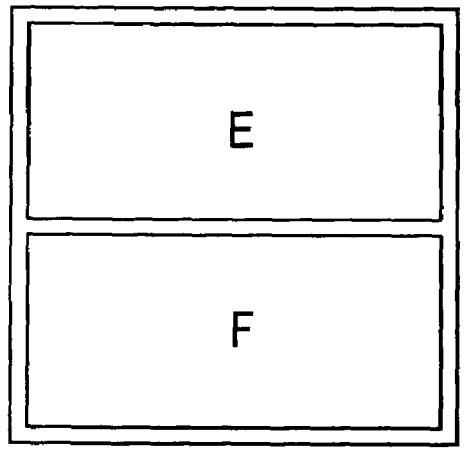
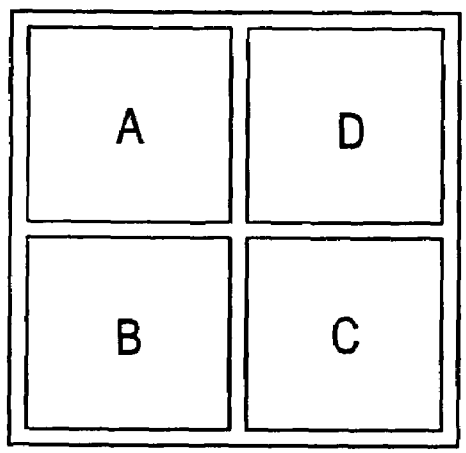
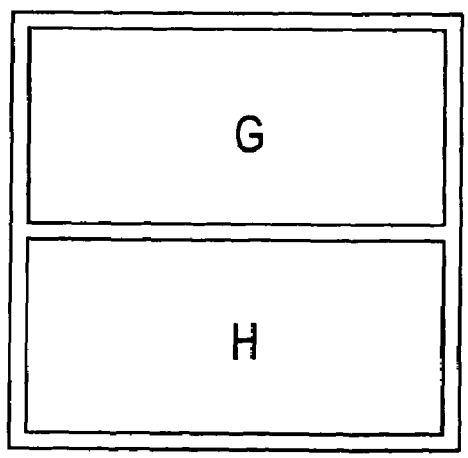

FE = (A+C) − (B+D)

OPTICAL RECORDING/REPRODUCTION DEVICE AND FOCAL POINT CONTROL METHOD

TECHNICAL FIELD

The present invention relates to an optical recording/playback apparatus and a focus-control method therefor.

BACKGROUND ART

Documents listed below will be used as references for the following description.

Reference Document (1): S. Kubota, "Aplanatic condition required to reproduce jitter-free signals in optical disk system," Appl. Opt. Vol. 26, pp. 3961–3973 (1987)

Reference Document (2): I. Ichimura, F. Maeda, K. Osato, K. Yamamoto, and Y. Kasami, "Optical disk recording using a GaN blue-violet laser diode," Jpn. J. Appl. Phys. Vol. 39, pp. 937–942 (1999)

Reference Document (3): M. Itonaga, F. Ito, K. Matsuzaki, S. Chaen, K. Oishi, T. Ueno, and A. Nishizawa, "NA=0.85 single objective lens for a high density optical disk system," Digest of International Symposium on Optical Memory, Taipei, pp. 26–27 (2001)

Reference Document (4): T. Ariyoshi, T. Shimano, and K. Maruyama, "0.85-NA single-objective lens using aberration-compensation methods," Digest of International Symposium on Optical Memory, Taipei, pp. 268–269 (2001)

Reference Document (5): S. Ohtaki, N. Murao, M. Ogasawara, and M. Iwasaki, "The application of a liquid crystal panel for the 15 Gbyte optical disk systems," Jpn. J. Appl. Phys. 38, pp. 1744–1749 (1999)

Reference Document (6): M. Iwasaki, M. Ogasawara, and S. Ohtaki, "A new liquid crystal panel for spherical aberration compensation," Digest of Optical Data Storage Topical Meeting, SPIE 4342, pp. 103–105 (2001)

Reference Document (7): K. Osato, I. Ichimura, F. Maeda, K. Yamamoto, and Y. Kasami, "Progress in optical disk recording with over 20 GB of capacity," Tech. Digest of Optical Data Storage Topical Meeting, Whistler, pp. 15–17 (2000)

Reference Document (8): T. Shimano, M. Umeda, and T. Ariyoshi, "Spherical aberration detection in the optical pickups for high-density digital versatile discs," Jpn. J. Appl. Phys. 40, pp. 2292–2295 (2001)

For recording and playing back digital data, optical disk (including optical magnetic disks), such as CDs (Compact Disks), MDs (Mini-Disks), and DVDs (Digital Versatile Disks), used as recording media are known. Optical disk is a generic term for a recording medium in which a metal-film disk protected by plastic receives and reflects a laser beam and causes a change in the beam to produce a signal to be read out.

There are two types of optical disks, one of which is a playback-only type generally known as, for example, a CD, a CD-ROM, or a DVD-ROM, and the other one of which is a recordable type that is capable of recording user data generally known as, for example, an MD, a CD-R, a CD-RW, a DVD-R, a DVD-RW, a DVD+RW, or a DVD-RAM. In the recordable type, optical-magnetic recording, phase-change recording, and pigment-layer change recording, for example, are used to record data. The pigment-layer change recording is also known as write-once recording in which data is recordable only once and is not rewritable, and is thus suitable for use in data storage. On the other hand, optical-magnetic recording and phase-change recording are capable of rewriting data and are used for recording content data such as music, video, games, and application programs.

Furthermore, the recent development of a high-density optical disk called a DVR (Data & Video Recording) has dramatically increased the storage capacity.

In a disk drive, such as an optical recording/playback apparatus that performs recording and playback on these types of optical disks, when the spot size on the recording medium is indicated by $\phi$, the wavelength of a laser beam is indicated by $\lambda$, and the numerical aperture of an objective lens is indicated by NA, the following equation (Equation (1)) is given:

$$\phi = \lambda/NA \qquad \text{Equation (1)}$$

This implies that a shorter wavelength light source or a higher numerical aperture of the objective lens reduces the spot size $\phi$, thus achieving high-density recording.

An objective lens used in an optical recording/playback apparatus is designed such that the lens has minimum wavefront aberrations with respect to a certain transmissive protection layer (cover layer) of the recording medium, such as a disk. In a CD drive, for example, the objective lens is optimized with respect to the 1.2 mm cover-layer thickness of the CD. Furthermore, in a DVD drive, the objective lens is optimized with respect to the 0.6 mm cover-layer thickness of the DVD.

In a DVD drive in which the information-recording layer of the DVD has a double-layer structure, an objective lens with a numerical aperture of 0.6 is used and a red laser diode having a wavelength of 650 nm is employed as the light source.

The tolerance of the objective lens with respect to different thicknesses of the cover layer is represented by the following equation (Equation (2)) from Reference Document (1):

$$W_{40} = \frac{\Delta t(n^2 - 1)NA^4}{8n^3} \qquad \text{Equation (2)}$$

where $\Delta t$ indicates the thickness variation of the cover layer, and n indicates the refractive index.

For example, if the value of tolerable spherical aberration ($W_{40}$) is $\lambda/4$, the tolerable variation of the cover-layer thickness ($\Delta t$) of the DVD drive is ±27 μm. Regarding the double-layer disk used in the DVD drive, the distance between the two information-recording layers is predetermined at about 40 μm so as to fall within the tolerance mentioned above.

Reference Document (2) discloses a high-capacity optical-disk-drive achieved by providing a shorter wavelength for the light source and a higher numerical aperture for the objective lens. This optical disk drive uses a double lens having a numerical aperture of 0.85 and a blue-violet laser diode to achieve a DVD-size optical disk with a capacity of over 22 GB.

Recently, a single lens is used as an objective lens in place of the double lens and achieves a numerical aperture of 0.85. In comparison with the double lens, a larger working distance is obtained using the single lens. This technique has been disclosed in, for example, Reference Document (3) and Reference Document (4).

The optical disk drives described in Reference Documents (2) to (4) require a precise cover-layer thickness of not more than ±4 μm, derived from Equation (2).

In the optical disk drive of Reference Document (2) having the lens with a high numerical aperture, in order to achieve the same double-layer disk as in the DVD drive, about 20 μm of an interlayer distance is required to prevent interlayer interference of information signals. For this reason, the cover-layer thickness does not fall within the tolerance range (±4 μm).

Accordingly, Japanese Unexamined Patent Application Publication No. 2000-131603, for example, discloses a technique in which an expander lens is provided to compensate for spherical aberrations caused by the various thicknesses of the cover layer depending on the number of the information layers. Further effective compensation techniques that employ a liquid crystal element are disclosed in Reference Document (5) and Reference Document (6).

However, when the set amount of the spherical-aberration compensation employing the expander lens or the liquid crystal element is different from the required amount for the cover-layer thickness for the target information-recording layer, the spherical aberrations caused interfere with the generation of an optical focusing error signal. This may disadvantageously cause difficulties in the focusing operation.

In particular, when performing the focus control on an optical recording medium having two or more information-recording layers, the spherical-aberration compensation must be optimized for each target information-recording layer.

For this reason, there is a demand for an appropriate technique for focusing a laser beam to a focal spot so that a certain information-recording layer of a multilayer optical recording medium can be accessed using an objective lens having a high numerical aperture, for example, NA=0.85.

Furthermore, in an actual optical recording/playback apparatus, the case where a single-information-recording-layer recording medium is loaded and the case where a multiple-information-recording-layer recording medium is loaded may both exist. Consequently, for focus control, it is necessary to determine the number of information-recording layers in advance so as to perform the focusing operation on the desired information-recording layer.

In the case where the recording medium, such as a disk, is held in, for example, a cartridge, the number of information-recording layers may be determined by mechanically or optically detecting the presence of a detection hole provided in the cartridge for differentiating between disk types. However, if a disk is not held in a cartridge, an additional determining technique may be necessary.

DISCLOSURE OF INVENTION

In view of these circumstances, an object of the present invention is to achieve proper focus control on an information-recording layer of a recording medium having a single layer or multiple layers. In particular, the present invention provides an appropriate method for focusing on, for example, a high-capacity disk when using an objective lens having a high numerical aperture.

An optical recording/playback apparatus of the present invention that records and plays back information by projecting a laser beam onto a recording medium having a single information-recording layer or multiple information-recording layers includes objective-lens means which has a predetermined numerical aperture and is provided as an output end for the laser beam; compensation optical means for compensating for spherical aberrations caused by the thickness of a transmissive protection layer (cover layer) provided for the information-recording layer of the recording medium; moving means for moving the objective lens along the optical axis; reflected-beam detecting means for detecting the laser beam reflected by the recording medium and for outputting reflected-beam information; determination means for determining the polarity of a focusing error signal generated as the reflected-beam information and the level of a reflected-beam intensity signal generated as the reflected-beam information; and focus control means for performing a focusing operation based on the determination information from the determination means by using the moving means to move the objective-lens means along the optical axis in a state where the compensation optical means is optimized with respect to the thickness of a certain transmissive protection layer.

In this case, the objective-lens means has a numerical aperture of at least 0.8.

The determination means outputs a comparison result of the thresholds of the focusing error signal at a predetermined positive level and a predetermined negative level, the comparison result acting as the polarity information of the focusing error signal.

The focus control means performs the focusing operation on the target information-recording layer based on the direction in which the objective-lens means is moved by the moving means and based on the order of occurrences of the polarity information of the focusing error signal obtained by the determination means.

The focus control means performs the focusing operation on the target information-recording layer based on the direction in which the objective-lens means is moved by the moving means and based on the order and the number of occurrences of the polarity information of the focusing error signal obtained by the determination means.

The focus control means substantially adjusts the setting of the compensation optical means with respect to an average thickness of transmissive protection layers provided for the corresponding multiple information-recording layers of the recording medium. Here, the average thickness acts as the thickness of the certain transmissive protection layer.

Alternatively, the focus control means adjusts the setting of the compensation optical means with respect to the thickness of a transmissive protection layer for one of the multiple information-recording layers of the recording medium, the information-recording layer being targeted for the focusing operation. Here, the thickness of the transmissive protection layer acts as the thickness of the certain transmissive protection layer.

In a case where the focusing operation is performed on one of the multiple information-recording layers of the recording medium and is then performed on another information-recording layer, the focus control means performs the focusing operation on the other information-recording layer based on the determination information from the determination means by using the moving means to move the objective-lens means along the optical axis in a state where the compensation optical means is optimized with respect to the thickness of the certain transmissive protection layer.

In that case, the focus control means adjusts the setting of the compensation optical means with respect to the thickness of a transmissive protection layer for the other information-recording layer. Here, the thickness of the transmissive protection layer acts as the thickness of the certain transmissive protection layer.

Alternatively, the focus control means substantially adjusts the setting of the compensation optical means with respect to an average thickness of transmissive protection layers each provided for one information-recording layer and the other information-recording layer. Here, the average thickness acts as the thickness of the certain transmissive protection layer.

The optical recording/playback apparatus further includes optimization means for optimizing the amount of compensation of the compensation optical means in response to a playback signal or a spherical-aberration error signal after performing the focusing operation on the target information-recording layer. The playback signal and the spherical-aberration error signal act as the reflected-beam information.

A focus-control method of the present invention is for performing the focusing operation on the target information-recording layer in the optical recording/playback apparatus that records and plays back information by projecting a laser beam onto a recording medium having a single information-recording layer or multiple information-recording layers. The method includes adjusting the setting of the compensation optical means for optimization with respect to the thickness of the certain transmissive protection layer, the compensation optical means being provided for compensating for spherical aberrations caused by the thickness of the transmissive protection layer for the information-recording layer of the recording medium; determining the polarity of a focusing error signal and the level of a reflected-beam intensity signal while moving the objective lens having a predetermined numerical aperture along the optical axis, the focusing error signal being obtained as reflected-beam information of the laser beam from the recording medium, the reflected-beam intensity signal being generated as the reflected-beam information, the objective lens being provided as an output end for the laser beam; and performing the focusing operation based on the determination information obtained by the determination.

In this case, the objective lens has a numerical aperture of at least 0.8.

Furthermore, the polarity of the focusing error signal is determined by comparing the thresholds of the focusing error signal at a predetermined positive level and a predetermined negative level, and the comparison result acts as the determination information for the polarity of the focusing error signal.

The focusing operation is performed on the target information-recording layer based on the moving direction of the objective lens and based on the order of occurrences of the polarity information of the focusing error signal obtained by the determination.

Furthermore, the focusing operation is performed on the target information-recording layer based on the moving direction of the objective lens and based on the order and the number of occurrences of the polarity information of the focusing error signal obtained by the determination.

The compensation optical means is substantially adjusted with respect to an average thickness of transmissive protection layers for the corresponding multiple information-recording layers of the recording medium. Here, the average thickness acts as the thickness of the certain transmissive protection layer.

Alternatively, the compensation optical means is adjusted with respect to the thickness of a transmissive protection layer for one of the multiple information-recording layers of the recording medium, the information-recording layer being targeted for the focusing operation. Here, the thickness of the transmissive protection layer acts as the thickness of the certain transmissive protection layer.

In a case where the focusing operation is performed on one of the multiple information-recording layers of the recording medium and is then performed on another information-recording layer, the objective lens moved in a state where the setting of the compensation optical means is optimized with respect to the thickness of the certain transmissive protection layer; the polarity of the focusing error signal and the level of the reflected-beam intensity signal are then determined, the focusing error signal being obtained as reflected-beam information of the laser beam from the recording medium, the reflected-beam intensity signal being generated as the reflected-beam information; and the focusing operation is performed on the other information-recording layer based on the determination information obtained by the determination.

In this case, the compensation optical means is adjusted with respect to the thickness of a transmissive protection layer for the other information-recording layer. Here, the thickness of the transmissive protection layer acts as the thickness of the certain transmissive protection layer.

Alternatively, the focus control means substantially adjusts the setting of the compensation optical means with respect to an average thickness of transmissive protection layers each provided for one information-recording layer and the other information-recording layer. Here, the average thickness acts as the thickness of the certain transmissive protection layer.

The method further includes optimizing the amount of compensation of the compensation optical means in response to the playback signal or the spherical-aberration error signal after performing the focusing operation on the target information-recording layer. The playback signal and the spherical-aberration error signal act as the reflected-beam information.

According to the present invention, when performing the focus control on the target information-recording layer of the recording medium, the spherical-aberration compensation is first adjusted with respect to the thickness of the transmissive protection layer (cover layer) for the target information-recording layer. Alternatively, the spherical-aberration compensation may be adjusted with respect to the average thickness of the transmissive protection layers (cover layers) for the corresponding multiple information-recording layers.

The objective lens is then moved along the optical axis to perform the focus-searching operation. The polarity of the focusing error signal and the level of the reflected-beam intensity signal generated as the reflected-beam information are observed so as to perform the focusing operation.

An S-curve, i.e., the focusing error signal, is obtained when the focal spot is shifted through an information-recording layer by the movement of the objective lens along the optical axis. The polarity detection of the focusing error signal allows detection of the number of information-recording layers and the focusing timing for the target information-recording layer.

Furthermore, when the focus-searching operation is performed in a state where the compensation is adjusted with respect to the average thickness of the transmissive protection layers (cover layers) for the corresponding multiple information-recording layers, S-curves, i.e., the focusing error signal, at an equivalent level are detected as the focal spot is shifted through the information-recording layers. Based on the order of occurrences of the polarities according to the moving direction of the lens, the focusing timing for the target information-recording layer can be detected. Furthermore, the number of occurrences of the S-curves allows detection of the number of the information-recording layers.

If the focus-searching operation is performed in a state where the spherical-aberration compensation is adjusted with respect to the thickness of the transmissive protection layer (cover layer) for the target information-recording layer, an S-curve with large amplitude is detected as the focal spot is shifted through the target information-recording layer. Accordingly, the polarity detection allows accurate detection of the focusing timing for the target information-recording layer.

BRIEF DESCRIPTION OF THE DRAWINGS

FIG. 6 illustrates photo-detecting patterns of a photo-detecting element according to the embodiment.

BEST MODE FOR CARRYING OUT THE INVENTION

Figure 1:
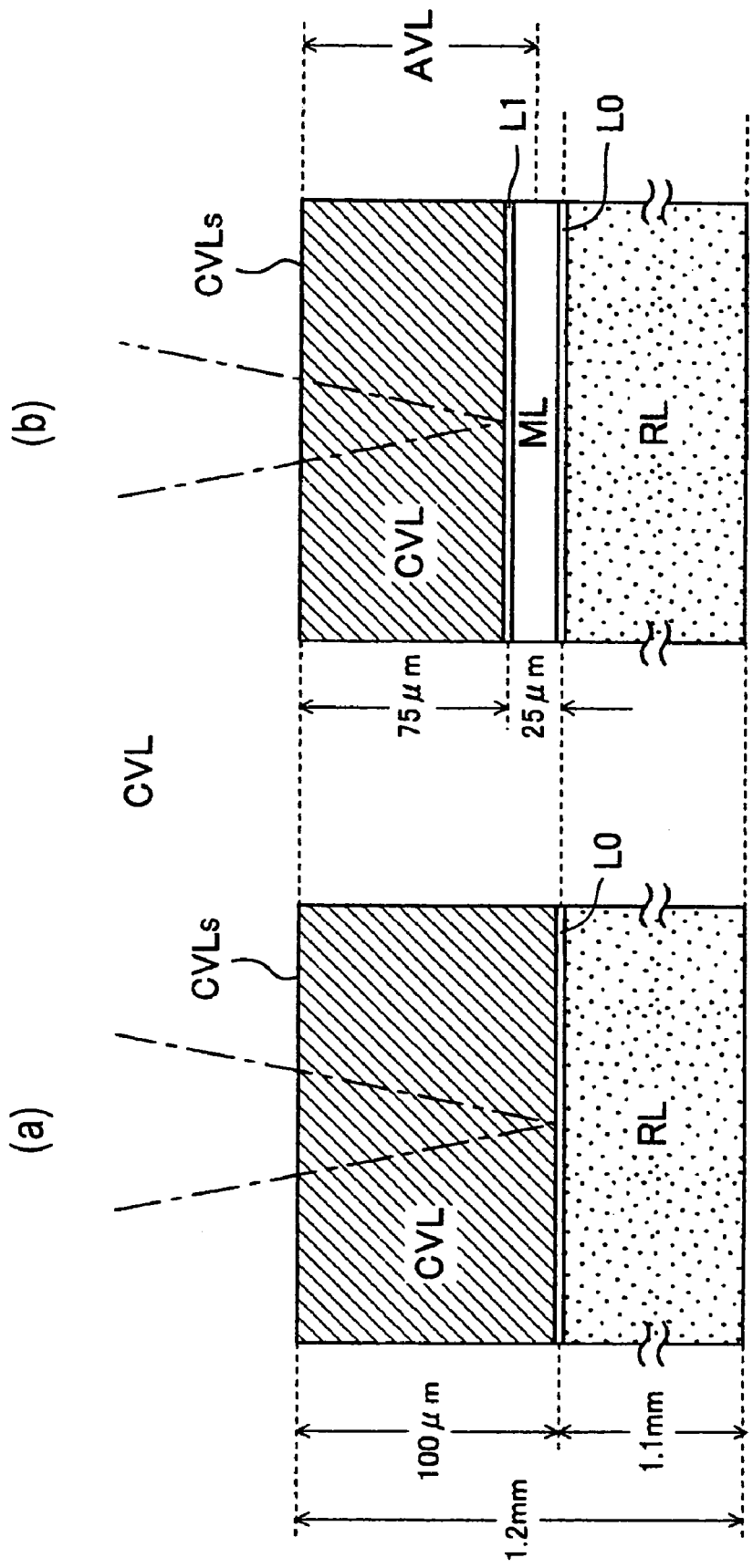
FIG. 1 is a schematic diagram showing the layer structure of a disk used for recording and playback in an embodiment according to the present invention.

An embodiment of the present invention will now be described in the following order.
1. Layer Structure of Disk
2. Structure of Recording/Playback Apparatus
3. Spherical-aberration Compensation State and S-curve
4. First Focus Control
5. Second Focus Control
6. Third Focus Control
7. Optimization after Focusing Operation 1. Layer Structure of Disk As a disk used for recording and playback in the recording/playback apparatus of this embodiment, a single-layer disk and a double-layer disk will be described below.

The disk of this embodiment falls in the category of high-density optical disks, such as DVRs developed in recent years, and includes a 0.1-mm-thick cover layer (transmissive protection layer: substrate).

According to this disk, phase-change marks are recorded and played back by a combination of a 405-nm-wavelength laser (i.e., a blue laser) and a 0.85-NA objective lens. A track pitch of 0.32 µm, a linear density of 0.12 µm/bit, and a data block size of 64 KB (kilobytes) are defined as one recording/playback unit to obtain a format efficiency of 82%. In such a case, a disk with a 12-cm diameter may have a capacity of about 23.3 GB (gigabytes) for recording and playback.

Furthermore, providing a multilayer structure for the recording layer may further increase the capacity. For example, two recording layers double the capacity to 46.6 GB.

It is also possible to provide an n-layer disk with three or more layers to increase the capacity by n times.

FIG. 1(a) and FIG. 1(b) schematically illustrate the layer structures of the single-layer disk and the double-layer disk, respectively.

Each of the disk types has a thickness of 1.2 mm and includes a polycarbonate substrate RL having a thickness of about 1.1 mm.

An optical beam from the disk drive (recording/playback apparatus) for recording on or playing back a disk 1 is represented by a dash-dot line. The optical beam is a blue laser beam with a wavelength of 405 nm and is focused from a side adjacent to a cover layer (substrate) CVL, as shown in the drawing, by an objective lens having a numerical aperture of 0.85.

In the single-layer disk of FIG. 1(a), a recording layer L0 of a phase-change-recording film is disposed on the substrate RL having a thickness of, for example, 1.1 mm. On the recording layer L0, a cover layer CVL with a thickness of 100 µm is disposed.

During recording or playback, the optical beam is focused on the recording layer L0 from the side adjacent to the cover layer CVL.

In the double-layer disk of FIG. 1(b), the recording layer L0 of a first phase-change-recording film is disposed on the substrate RL having a thickness of, for example, 1.1 mm. A recording layer L1 of a second phase-change-recording film is disposed above the recording layer L0, having an intermediate layer ML with a thickness of 25 µm therebetween. On the recording layer L1, a cover layer CVL having a thickness of 75 µm is disposed.

During recording or playback, the optical beam is focused on the recording layers L0 and L1 from the side adjacent to the cover layer CVL.

Like the single-layer disk, the first recording layer L0 of the double-layer disk is disposed 100 µm below a surface CVLs of the cover layer CVL.

Accordingly, from the recording layer L0 of the single-layer disk and the recording layer L0 of the double-layer disk, the thickness of the cover layer CVL is 100 µm.

On the other hand, from the recording layer L1 of the double-layer disk, the thickness of the cover layer CVL is 75 μm.

Although not shown in the drawing, when providing an n-layer disk with three or more layers, a 25-μm-thick intermediate layer ML may be disposed above the recording layer L1 of FIG. 1(b) adjacent to the cover-layer surface CVLs to form a recording layer Ln on the layer ML.

In other words, an n-th recording layer L(n–1) is disposed above an (n–1)th recording layer L(n–2), with an intermediate layer ML therebetween. In the case where the n-th recording layer L(n–1) is provided, the thickness of the cover layer CVL is 100–(n–1)×25 μm.

2. Structure of Recording/Playback Apparatus

The structure of the recording/playback apparatus according to this embodiment employing the 0.85-NA double objective lens and the 405 nm-wavelength blue-violet laser diode as the light source will now be described.

Figure 2:
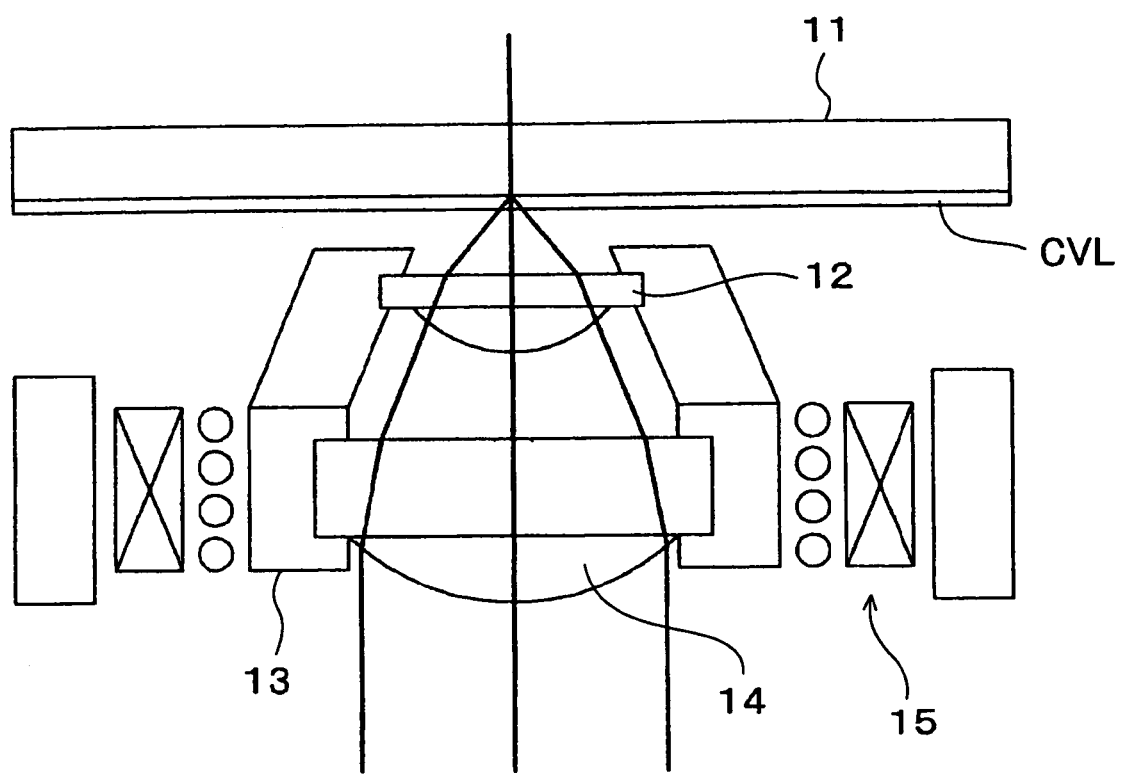
FIG. 2 is a schematic diagram of an objective lens according to the embodiment.

FIG. 2 illustrates the double objective lens included in an optical head (optical pickup) of the recording/playback apparatus.

The double objective lens, which acts as an output end of a laser beam directed towards the disk 11, consists of a first lens component (spherical-lens component 12) and a second lens component (converging-lens component 14).

The spherical-lens component 12 and the converging-lens component 14 are supported by a lens holder 13 such that the two lens components 12 and 14 are aligned along the same optical axis. The two lens components function as the double objective lens with a numerical aperture of 0.85.

The lens holder 13, which supports the spherical-lens component 12 and the converging-lens component 14 of the double objective lens, is disposed on an electromagnetic actuator 15. The electromagnetic actuator 15 is a two-axis mechanism that moves the double objective lens in the optical-axis direction and also in the radial direction of the disk. The optical-axis direction is the direction for moving into and out of contact with the disk 11, i.e., the focusing direction. On the other hand, the radial direction of the disk is the direction for moving across the tracks on the disk 11, i.e., the tracking direction.

A laser beam emitted from a semiconductor-laser light source, which will be described later, is transmitted through the two lens components 12 and 14 and is focused on the disk 11. In comparison with conventional optical pickups, a higher numerical aperture is achieved in this embodiment, and therefore, the working distance in the focusing direction is reduced. In detail, the working distance in this embodiment is approximately 140 μm.

Generally, a higher numerical aperture of the objective lens reduces the tilt tolerance of the disk in an optical-disk recording/playback apparatus.

If the tilt angle of a disk with respect to the optical axis is indicated by θ, the comatic aberration ($W_{31}$) caused is represented by the following equation (Equation (3)) from Reference Document (1):

$$W_{31} = \frac{t(n^2-1)n^2\sin\theta\cos\theta \cdot NA^3}{2(n^2-\sin^2\theta)^{5/2}} \quad \text{Equation (3)}$$

where the comatic aberration ($W_{31}$) is generally proportional to the numerical aperture (NA) to the third power and also to the cover-layer thickness t of the disk.

Accordingly, if the tolerable comatic aberration ($W_{31}$) is λ/4 in the optical-disk recording/playback apparatus with a high numerical aperture of 0.85, in order to obtain a disk tilt tolerance equivalent to that in a DVD playback apparatus, the thickness of the cover layer CVL of the disk 11 must be reduced to about 0.1 mm, as shown in FIG. 1.

Figure 3:
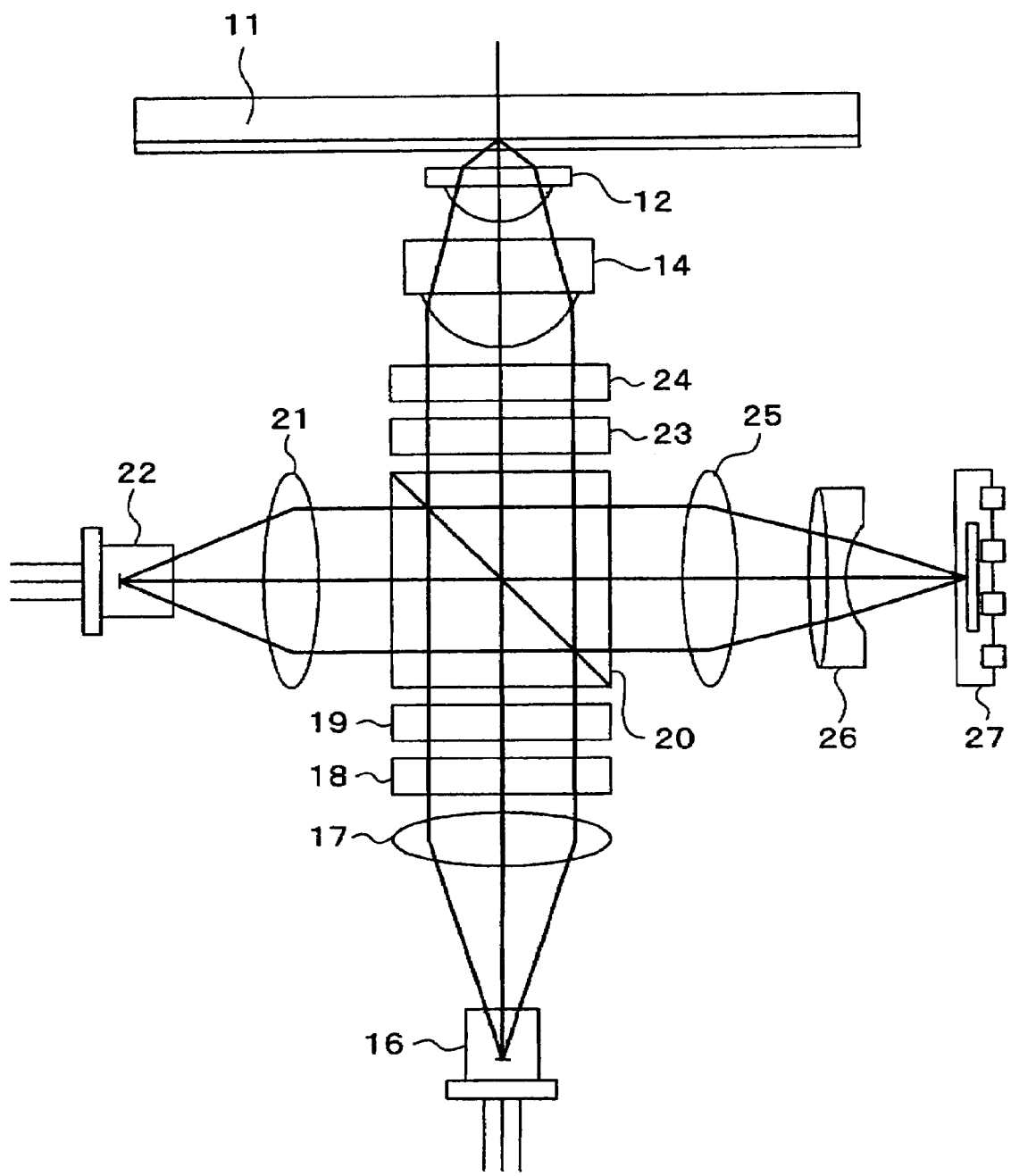
FIG. 3 is a schematic diagram of an optical system according to the embodiment.

FIG. 3 illustrates an optical system of the optical pickup having the double objective lens.

A laser diode 16 is a blue-violet semiconductor laser light source with a wavelength of 405 nm.

A laser beam emitted from the laser diode 16 is collimated by a collimator lens 17.

A half-waveplate 18 controls the amount of light directed towards a photo-detector 22.

A diffraction grating 19 produces side spots which are used for calculating a tracking error signal.

A polarizing-beam splitter 20 controls the optical path according to the polarization state of the beam.

A liquid crystal element 23 compensates for spherical aberrations according to the thickness of the cover layer for the recording layer.

A quarter-waveplate 24 is disposed in front of the converging-lens component 14 and the spherical-lens component 12 (which may together be referred to as a double objective lens 14 and 12 hereinafter) to convert linearly polarized light emitted from the laser diode to circularly polarized light.

The laser beam emitted from the laser diode 16 is collimated by the collimator lens 17 and is transmitted through the half-waveplate 18 and the diffraction grating 19. The laser beam then reaches the polarizing-beam splitter 20 and is transmitted through the liquid crystal element 23 and the quarter-waveplate 24. The beam is then focused on the disk 11 by the double objective lens (14 and 12).

Some of the light rays emitted from the laser diode 16 are reflected by the polarizing-beam splitter 20. The rays are directed by a focusing lens 21 toward the photo-detector 22 for detecting the laser power output so as to regulate the laser power output at a constant value. The amount of light incident on the photo-detector 22 may be controlled by rotating the half-waveplate 18.

The actual laser power output level from the laser diode 16 is regulated to a desired value by an APC (Auto Power Control) circuit, which is not shown in the drawing. In other words, the APC circuit controls the output of the laser diode 16 by comparing the information of the laser power output level obtained from the photo-detector 22 with the desired laser power output level.

The liquid crystal element 23 is provided as compensation optical means that compensates for spherical aberrations caused by the thickness of the cover layer for the information-recording layers L0 and L1 of the disk 11.

Figure 4:
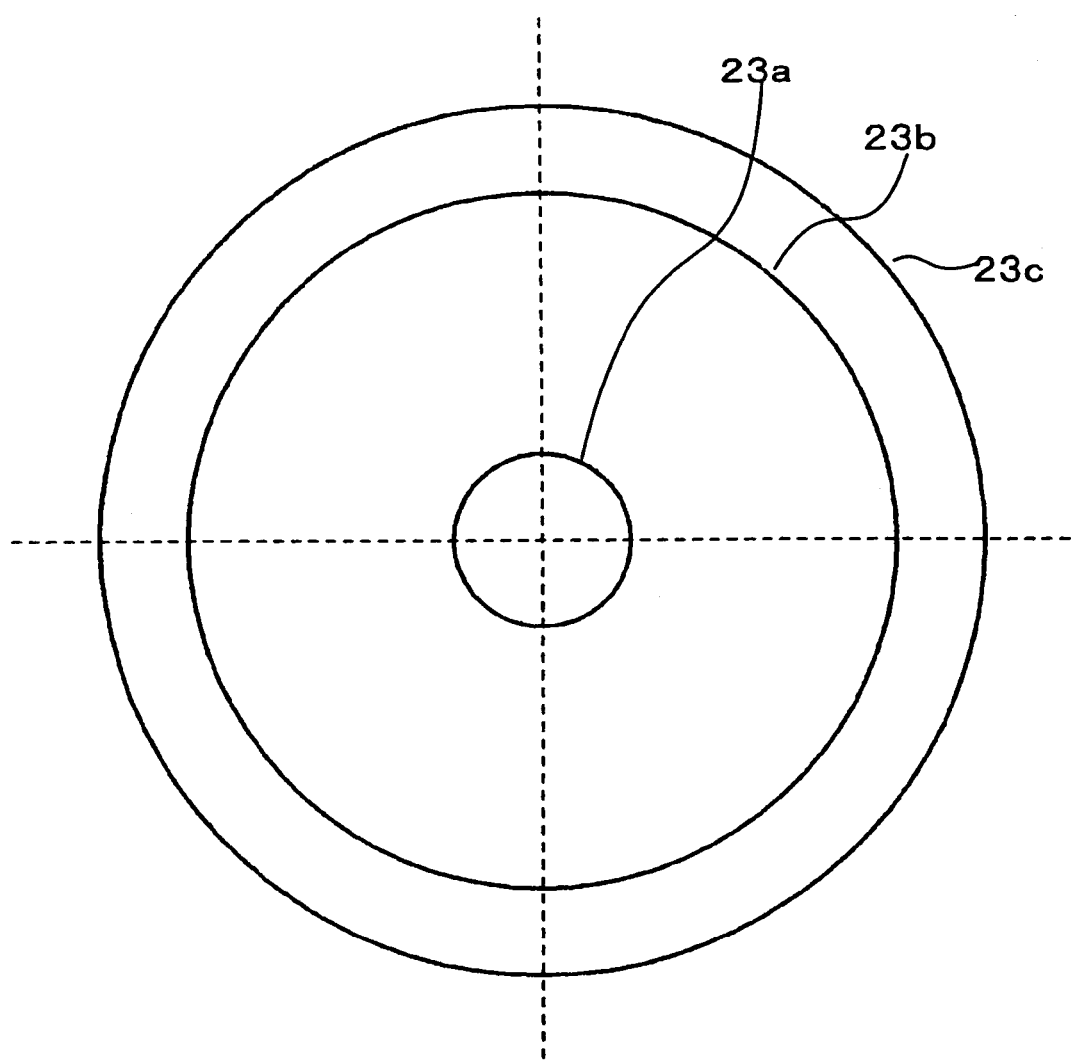
FIG. 4 illustrates electrode patterns of a liquid crystal element according to the embodiment.
Figure 5:
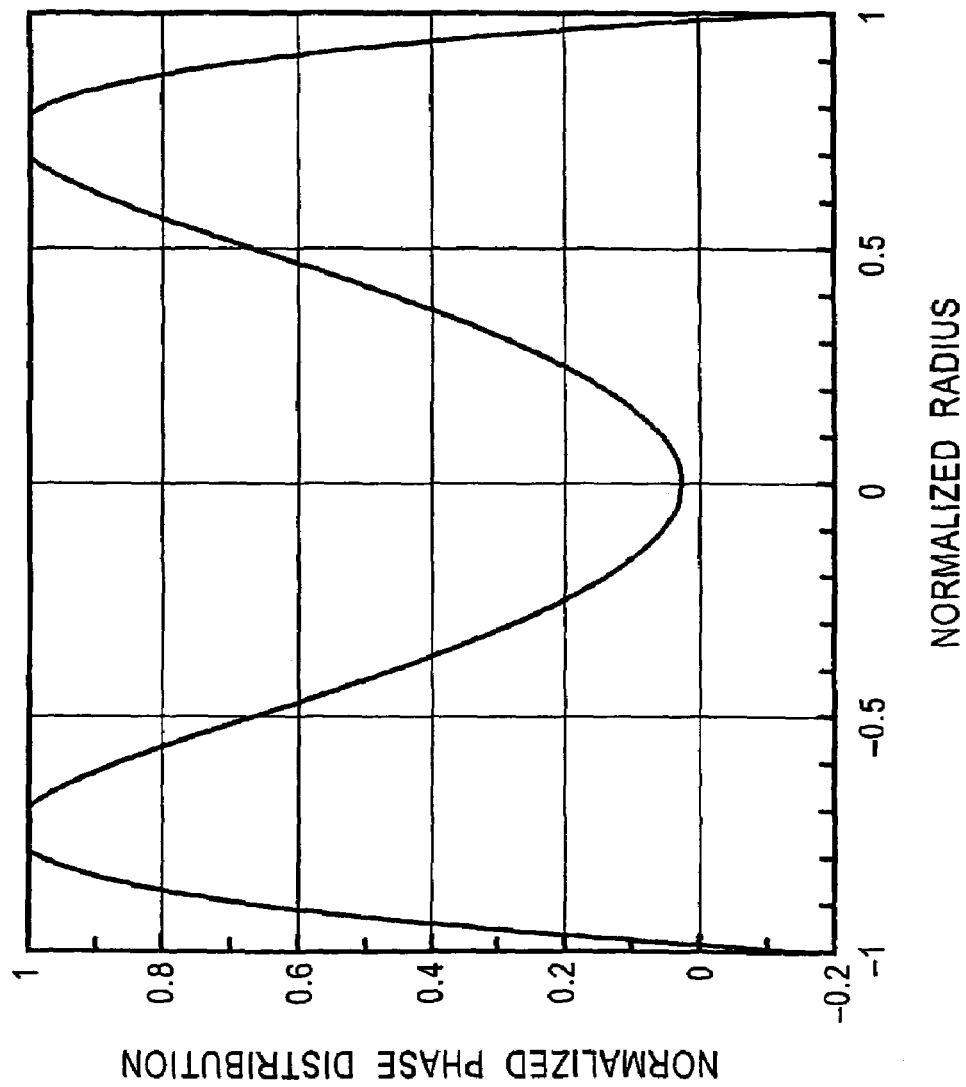
FIG. 5 illustrates a wavefront that substantially compensates for spherical aberrations according to the embodiment.

FIG. 4 illustrates electrode patterns of the liquid crystal element 23. As shown in the drawing, the liquid crystal element 23 includes concentric electrode patterns 23a, 23b, and 23c, as disclosed in Reference Documents (5) and (6). As shown in FIG. 5, in response to a voltage applied to the electrodes, the patterns 23a, 23b, and 23c can produce a wavefront that substantially compensates for spherical aberrations caused by differences of the cover-layer thickness.

Referring to FIG. 3, a laser beam reflected from the disk 11 is reflected by the polarizing-beam splitter 20 and is then directed towards a detection optical path. In this embodiment, the astigmatic method is used for the focusing error signal and the differential push-pull method is used for the tracking error signal. The beam then passes through a converging lens 25 and a multi-lens 26, which are provided along the detection optical path. The convergent beam enters a photo-detecting element 27 for detecting a servo error signal and a playback RF signal and is then photoelectrically converted.

The photo-detecting element 27 has photo-detecting patterns as shown in FIG. 6. The photo-detecting element 27 includes quarter-divided detectors having detecting portions A, B, C, and D; half-divided detectors having detecting portions E and F; and half-divided detectors having detecting portions G and H.

From each of the detecting portions A, B, C, D, E, F, G, and H, a current signal corresponding to the amount of light received is output. The current signal is then converted to a voltage signal and is subjected to calculation so as to produce a focusing error signal FE, a tracking error signal TE, and a playback RF signal.

The focusing error signal FE, the tracking error signal TE, and the playback RF signal are produced by calculation according to the following equations:

$$FE=(A+C)-(B+D) \quad \text{Equation (4)}$$

$$TE=(A+D)-(B+C)-k\{(E-F)+(G-H)\} \quad \text{Equation (5)}$$

$$RF=A+B+C+D \quad \text{Equation (6)}$$

Figure 7:
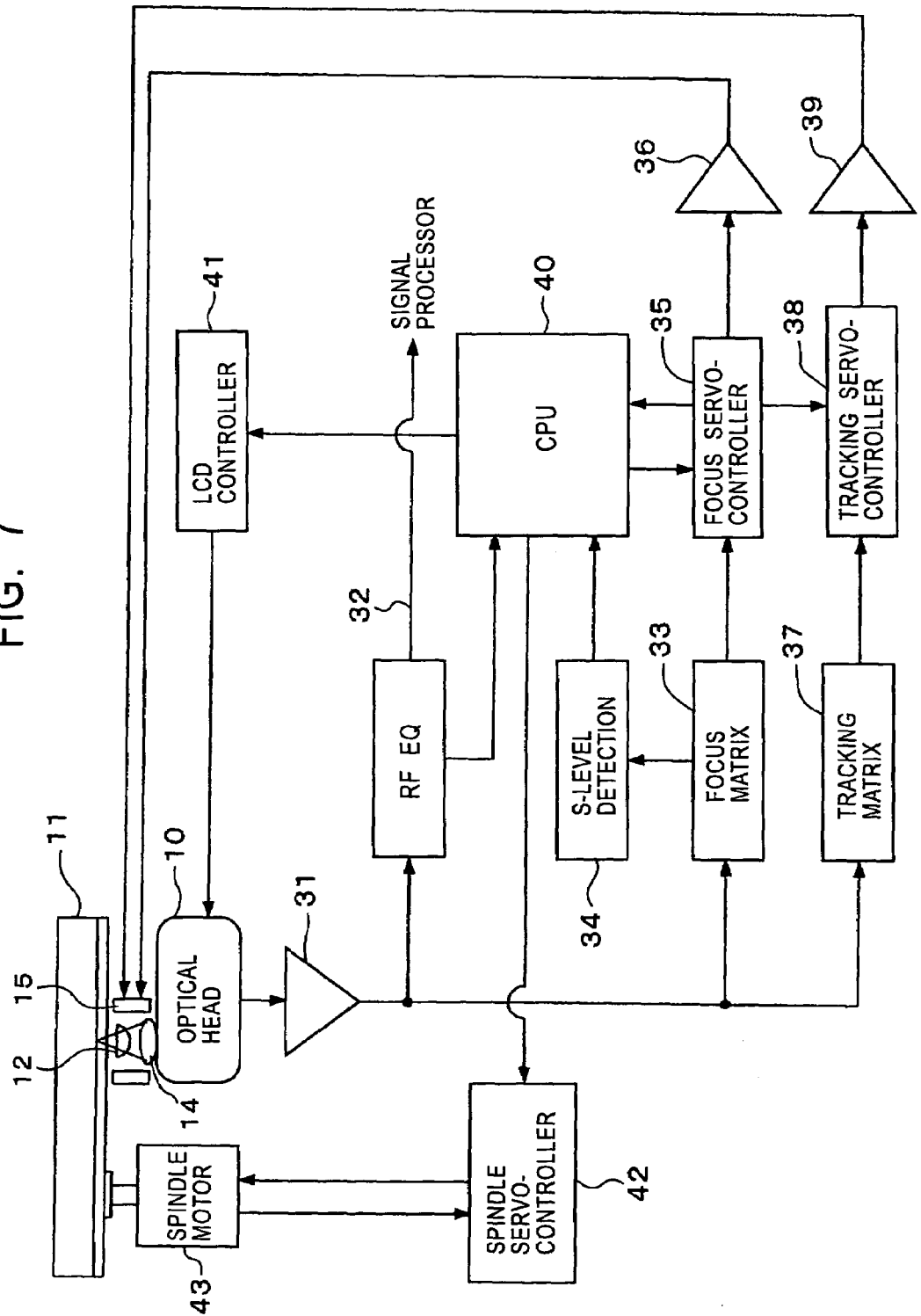
FIG. 7 is a block diagram of a recording/playback apparatus according to the embodiment.

FIG. 7 is a diagram of the recording/playback apparatus. FIG. 7 illustrates mainly a servo system; an information-recording/playback-processing system is omitted in the drawing.

The disk 11 is held by a turntable, not shown in the drawing, and is rotated at a constant linear velocity (CLV) or a constant angular velocity (CAV) by a spindle motor 43 during a recording or playback operation.

An optical pickup (optical head) 10 reads out information on the disk 11, namely, information recorded with, for example, embossed pits, wobbling grooves, or phase-change marks. Furthermore, the optical head 10 may also write information on the disk 11 using phase-change marks.

The optical head 10 includes the optical system shown in FIG. 3. A signal read out from the disk 11 by the optical system (reflected-beam information), that is, a signal output from each of the detecting portions A to H of FIG. 6, is input to a head amp 31. The head amp 31 amplifies the reflected-beam-information signal from the optical head 10 to a predetermined level required for processing in the subsequent stage.

Subsequently, in an equalizer amp 32, the amplified reflected-beam-information signal is calculated according to Equation (6) so as to produce a playback RF signal. The playback RF signal is equalized and is supplied to a signal processor, which is not shown in the drawing. The signal processor is a playback-signal processing system that performs, for example, decoding and error-correction of data.

The playback RF signal derived from Equation (6) corresponds to a sum signal SUM (SUM=A+B+C+D) acting as a reflected-beam intensity signal. The equalizer amp 32 includes a comparator for the sum signal SUM. The level information of the sum signal SUM is thus produced and output to the CPU 40.

The output from the head amp 31 is also supplied to a focus matrix circuit 33 and to a tracking matrix circuit 37.

The focus matrix circuit 33 performs calculation on the input signal using Equation (4) to produce a focusing error signal FE.

A sum signal SUM (SUM=A+B+C+D) acting as the reflected-beam intensity signal may also be produced in the focus matrix circuit 33.

The tracking matrix circuit 37 performs calculation on the input signal using Equation (5) to produce a tracking error signal TE.

A focus servo-controller 35 performs phase compensation on the focusing error signal FE supplied from the focus matrix circuit 33 to produce a focus drive signal. The focus drive signal is amplified in a drive amp 36 to drive a focus coil of the electromagnetic actuator 15 in the optical head 10. Consequently, the double objective lens (12 and 14) moves in the optical-axis direction such that the laser spot on the recording layer is maintained in its focused state, whereby focus servo-control is performed.

Accordingly, the optical head 10, the focus matrix circuit 33, the focus servo-controller 35, and the electromagnetic actuator 15 form a focus servo-loop.

The focus servo-controller 35 is controlled by the CPU 40 to perform a focus-searching operation so that the target spot on the recording layer of the disk 11 is brought into a focused state. In this case, the focus servo-loop is set in an off mode, and a search drive signal is generated to drive the focus coil of the electromagnetic actuator 15. Consequently, the double objective lens (12 and 14) is forced to move in the optical-axis direction within the focus stroke range of the lens to perform focusing. The focus-searching operation will be described later.

A tracking servo-controller 38 performs phase compensation on the tracking error signal TE supplied from the tracking matrix circuit 37 to produce a tracking drive signal. The tracking drive signal is amplified in a drive amp 39 to drive the tracking coil of the electromagnetic actuator 15 in the optical head 10. Consequently, the double objective lens (12 and 14) moves in the radial direction of the disk such that the laser spot is traced across the tracks on the disk 11, whereby tracking servo-control is performed.

Accordingly, the optical head 10, the tracking matrix circuit 37, the tracking servo-controller 38, and the electromagnetic actuator 15 form a tracking servo-loop.

In response to a track-jump command or an access command from the CPU 40, the tracking servo-controller 38 turns OFF the tracking servo-loop and outputs a jump drive signal to perform track-jumping and accessing.

Although not shown in the drawing, a sled mechanism is provided so as to move the entire optical head 10 in the radial direction of the disk.

The tracking servo-controller 38 uses a low-frequency component of the tracking error signal TE to produce a sled error signal and also produces a sled drive signal according to, for example, the access control by the CPU 40. Thus, the sled mechanism is driven to move the optical head 10 in the radial direction of the disk.

A spindle servo-controller 42 controls the spindle motor 43 to perform, for example, CLV rotation or CAV rotation.

When performing the CLV rotation, a PLL-type data playback clock (or a wobble playback clock) obtained from a playback signal processor, for example, may be used as information for the current rotational velocity. By comparing this information with a frequency corresponding to the standard velocity so as to derive error information, the spindle rotational velocity is controlled.

When performing the CAV rotation, the spindle rotational velocity is controlled such that the rotational velocity information obtained from, for example, an FG of the spindle motor 43 is set at a constant rotational velocity.

Furthermore, the spindle servo-controller 42 produces a spindle drive signal in response to a spindle kicking/braking signal from the CPU 40 so as to, for example, activate, terminate, accelerate, or decelerate the spindle motor 43.

Based on the set amount of the spherical-aberration compensation from the CPU 40, an LCD controller 41 applies a voltage to the electrode patterns of the liquid crystal element 23 in FIG. 4 so as to compensate for spherical aberrations.

An S-level detection circuit 34 includes, for example, a plurality of comparators for the focusing error signal FE (S-curve) obtained in the focus matrix circuit 33, by which the polarity information of the focusing error signal FE is output to the CPU 40.

When generating the sum signal SUM in the focus matrix circuit 33, the S-level detection circuit 34 may also be provided with a comparator for the sum signal SUM so that the level information of the sum signal SUM is produced and output to the CPU 40.

The operations of the servo system and the recording/playback signal processor, not shown in the drawing, described above are controlled by the CPU 40 functioning as a system controller.

3. Spherical-aberration Compensation State and S-curve

The spherical-aberration compensation state and S-curves of the focusing error signal FE obtained in that state will now be described.

Figure 8A:
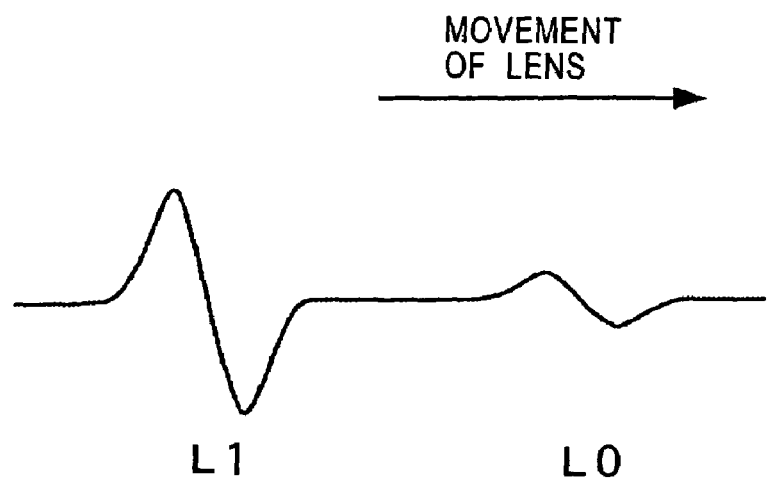
FIG. 8A to FIG. 8C each illustrate a focusing error signal obtained in response to the movement of the objective lens according to the embodiment.

FIG. 8A illustrates an observation of the focusing error signal FE where the double objective lens (12 and 14) is moved in one direction along the optical axis on a playback-only (ROM-type) disk having two information-recording layers L0 and L1, as in FIG. 1(*b*). For this playback-only disk, the setting of the liquid crystal element 23 for spherical-aberration compensation is optimized with respect to the cover-layer thickness (75 μm) for the second layer (information-recording layer L1).

The direction mentioned here is referred to as the moving direction of the objective lens toward the disk 11.

By using the multi-lens 26 of FIG. 3, which employs the astigmatic method for the focusing error signal FE in this embodiment, the intensity distribution over the detecting portions A, B, C, and D of the photo-detecting element 27 is made circular in the focused state. In any other state, the intensity distribution is elliptical.

Figure 9:
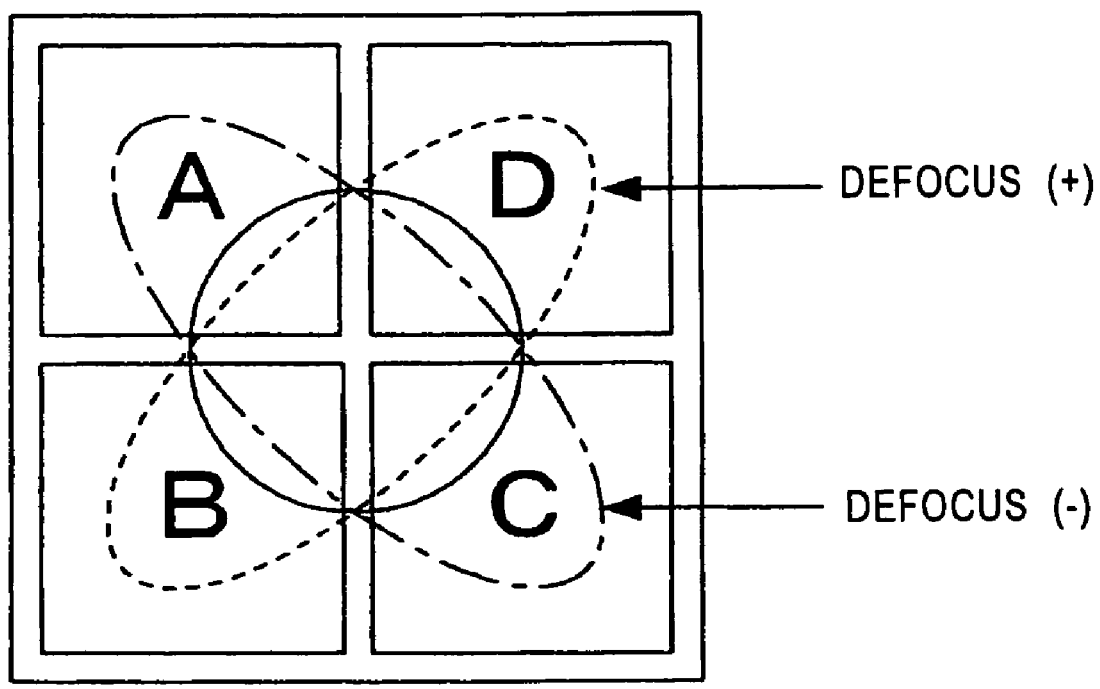
FIG. 9 schematically illustrates the photo-detection state of the focusing error signal in the photo-detecting element using the astigmatic method in accordance with the embodiment.

FIG. 9 illustrates the intensity distribution on the detecting portions A, B, C, and D, in which the distribution is circular in the focused state. In the defocused state, the intensity distribution has an elliptical shape with defocus (+) and defocus (−).

Accordingly, the focusing error signal FE derived from Equation (4) produces an output (commonly known as an S-curve) that is at the zero level in the focused state.

However, when the set amount of the spherical-aberration compensation is different from the optimal amount for the target recording layer to a large degree, the spherical aberrations caused may deteriorate the focal spot on the recording medium drastically. For this reason, an S-curve having the required signal amplitude cannot be obtained.

Accordingly, when the objective lens is moved in a state where the lens is optimized with respect to the cover-layer thickness for the information-recording layer L1, an S-curve with large amplitude is observed as the laser-spot focus position is shifted through the information-recording layer L1. On the other hand, when the laser-spot focus position is shifted through the information-recording layer L0, an S-curve with smaller amplitude is observed, as in FIG. 8A.

Figure 8B:
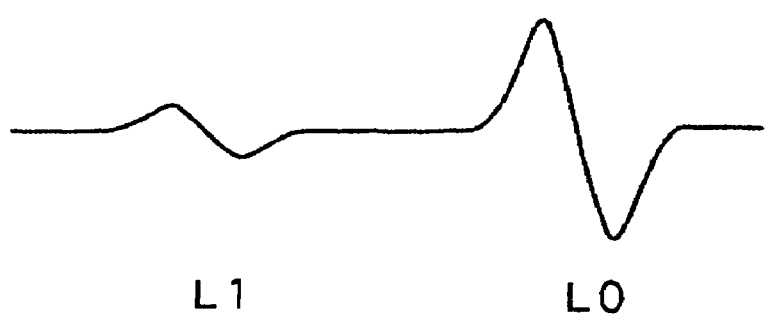

Furthermore, when the objective lens is moved in a state where the lens is pre-adjusted to compensate for the 100-μm cover-layer thickness for the information-recording layer L0, the focusing error signal FE observed is as shown in FIG. 8B, in which an S-curve with small amplitude is observed when the laser-spot focus position is shifted through the information-recording layer L1. When the laser-spot focus position is shifted through the information-recording layer L0, an S-curve with larger amplitude is observed.

On the other hand, when the setting of the liquid crystal element 23 is optimized with respect to an average of the cover-layer thicknesses for the information-recording layers L0 and L1, that is, a cover-layer thickness of, for example, 87 μm, which is substantially the average of 100 μm and 75 μm, the S-curves observed when the laser-spot focus position is shifted through the information recording layers L1 and L0 become substantially at the same level. In this case, however, the amplitude level is moderate.

4. First Focus Control

In view of these circumstances, first focus control for performing proper focus servo on the target information-recording layer of a single-layer disk or a multilayer disk, such as a double-layer disk, will now be described.

In the first focus control, to perform a proper focusing operation on a double-layer disk, the setting of the liquid crystal element 23 for spherical-aberration compensation is adjusted with respect to the intermediate position between the information-recording layers L0 and L1.

Figure 8C:

In other words, the liquid crystal element 23 is pre-adjusted such that its set amount is optimized with respect to a cover-layer thickness of, for example, 87 μm. In this case, as shown in FIG. 8C, the focusing error signal FE obtained does not reach the maximum S-curve amplitude, but is substantially even for both information-recording layers L0 and L1. By determining the number of appearances of the S-curves and also the signal polarity, a focusing operation for focus control on the target information-recording layer can be performed.

This method will now be described in detail.

Figure 10:
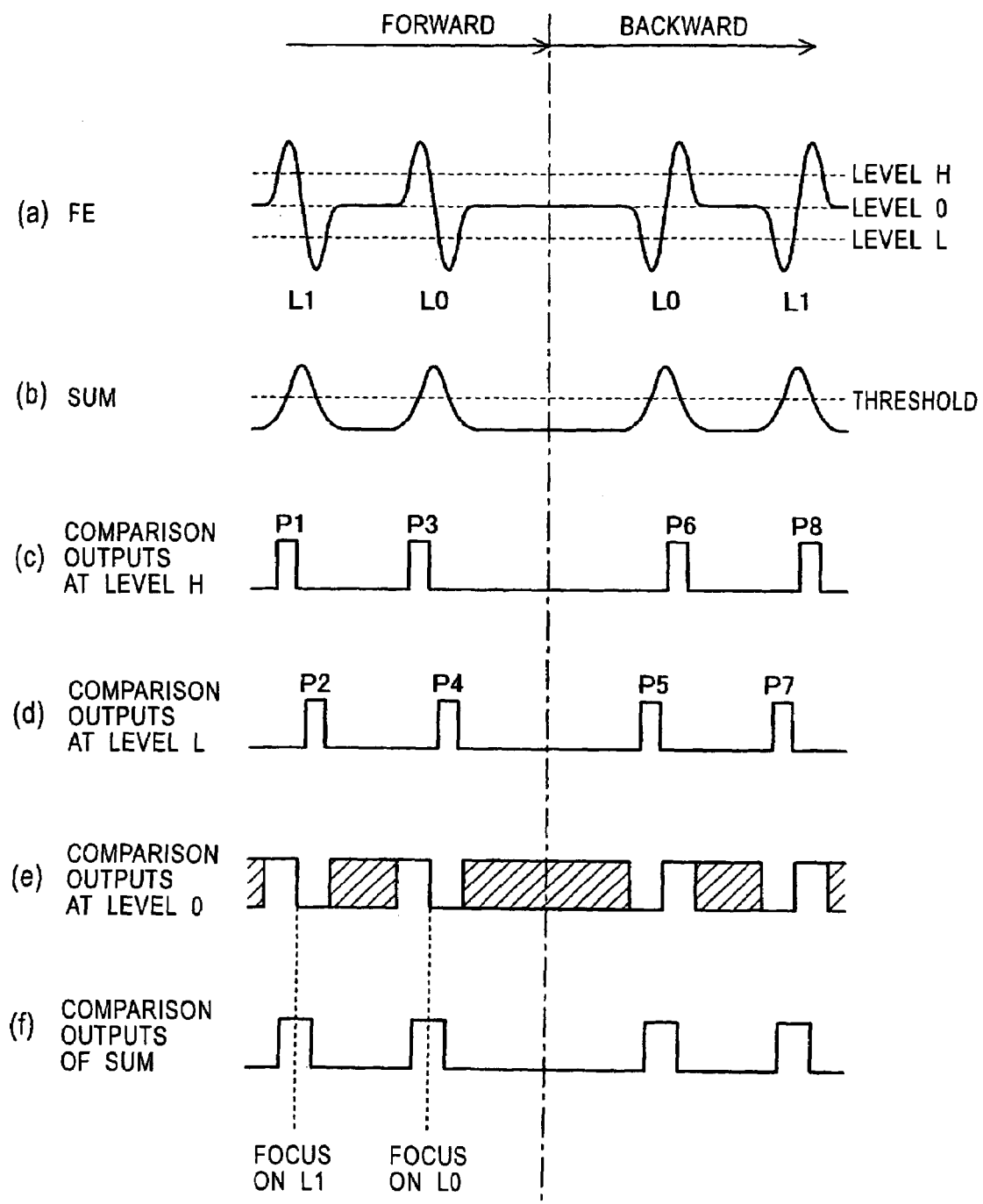
FIG. 10 schematically illustrates operation waveforms of a double-layer disk using first focus control according to the embodiment.

The comparators of the S-level detection circuit 34 shown in FIG. 7 compare the thresholds of the focusing error signal FE at a predetermined positive level (Level H), a predetermined negative level (Level L), and a zero level (Level 0), as shown in part (a) of FIG. 10. The comparison-output result is then sent to the CPU 40.

Part (a) of FIG. 10 illustrates an observation of the focusing error signal FE when the double objective lens (12 and 14) is reciprocated along the optical axis with respect to a double-layer disk.

The term "forward" refers to the direction in which the double objective lens (12 and 14) approaches the disk 11. The term "backward" refers to the direction in which the lens (12 and 14) withdraws from the disk 11.

Part (c) of FIG. 10 shows comparison outputs of the focusing error signal FE at the positive level (Level H).

Part (d) of FIG. 10 shows comparison outputs of the focusing error signal FE at the negative level (Level L).

Part (e) of FIG. 10 shows comparison outputs of the focusing error signal FE at the zero level (Level 0).

Part (b) of FIG. 10 illustrates an observation of the sum signal SUM (playback RF signal) when the double objective lens (12 and 14) is reciprocated along the optical axis with respect to a double-layer disk.

Part (f) of FIG. 10 shows comparison outputs of the sum signal SUM using the predetermined threshold (Threshold) shown in part (b) of FIG. 10.

The comparison outputs of each of parts (c), (d), (e), and (f) of FIG. 10 are supplied to the CPU 40.

The CPU 40 uses the comparison-output pulses in part (c) of FIG. 10 as information generated at the positive polarity level based on the focusing error signal FE. Furthermore, the comparison-output pulses in part (d) of FIG. 10 are used as information generated at the negative polarity level based on the focusing error signal FE. The comparison-output pulses in part (e) of FIG. 10 are used as information generated at the zero-crossing point based on the focusing error signal FE.

Furthermore, the CPU 40 uses the comparison-output pulses in part (f) of FIG. 10 as a signal detected within the focusing-operation range (linear region of the S-curve).

As the setting of the liquid crystal element 23 for spherical-aberration compensation is adjusted with respect to the intermediate position between the information-recording layers L0 and L1 and the double objective lens (12 and 14) is reciprocated along the optical axis, the CPU 40 uses the comparison outputs of each of parts (c) and (d) of FIG. 10 to detect the appearance order of the positive and the negative polarity-levels based on the focusing error signal FE. Thus, the information-recording layer for the focus control is selected.

In other words, during the forward movement in FIG. 10, pulses P1, P2, P3, and P4, acting as information for the polarity of the focusing error signal FE, are supplied to the CPU 40 in that order.

In the forward movement, the polarity of the focusing error signal FE is detected in the order positive→negative→positive→negative.

During the backward movement, pulses P5, P6, P7, and P8, acting as information for the polarity of the focusing error signal FE, are supplied to the CPU 40 in that order. The polarity of the focusing error signal FE is detected in the order negative→positive→negative→positive.

When performing the focusing operation on the information-recording layer L0, for example, the double objective lens (12 and 14) is first moved in the forward direction along the optical axis. After the polarity detection result of the focusing error signal FE in the order of 1. positive, 2. negative, and then 3. positive is reached, the focusing operation may begin in the vicinity of the zero-crossing point. In this case, a comparison output in part (f) of FIG. 10, in which the sum signal SUM level is above the constant threshold, is used to calculate the logical sum, whereby the execution of the focus control is ensured.

Alternatively, in the backward movement, the focusing operation may begin in the vicinity of the zero-crossing point after reaching the first negative polarity from the polarity detection result of the focusing error signal FE.

When performing the focusing operation on the information-recording layer L1, for example, the double objective lens (12 and 14) is first moved in the forward direction along the optical axis. The focusing operation may begin in the vicinity of the zero-crossing point after reaching the first positive polarity from the polarity detection result of the focusing error signal FE. In this case, a comparison output in part (f) of FIG. 10, in which the sum signal SUM level is above the constant threshold, is used to calculate the logical sum, whereby the execution of the focus control is ensured.

Alternatively, in the backward movement, after the polarity detection result of the focusing error signal FE in the order of 1. negative, 2. positive, and 3. negative is obtained, the focusing operation may begin in the vicinity of the zero-crossing point.

Figure 11:
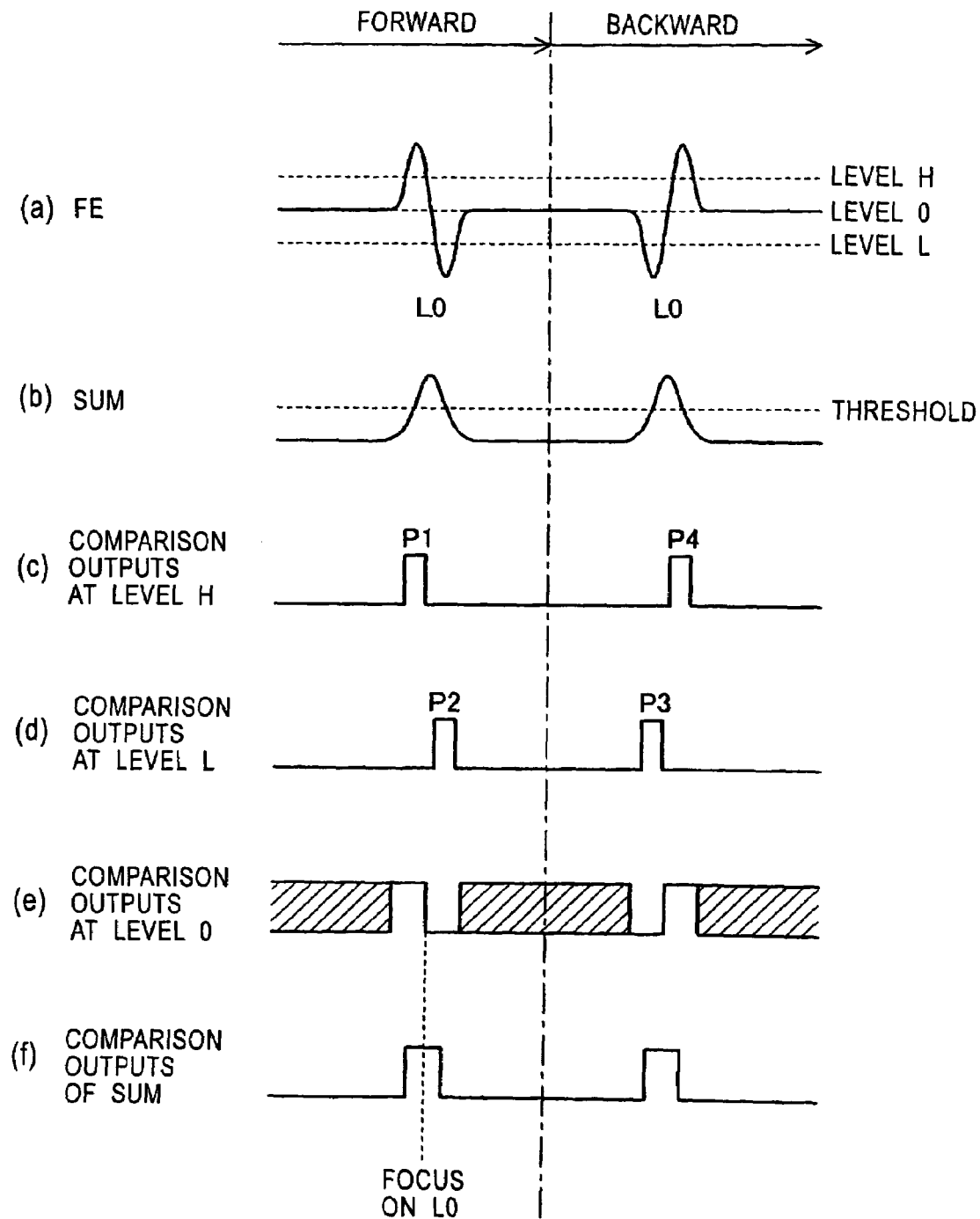
FIG. 11 schematically illustrates operation waveforms of a single-layer disk using the first focus control according to the embodiment.

For a single-layer disk, parts (a) to (f) of FIG. 11 respectively show the focusing error signal FE; the sum signal SUM; the comparison outputs of the focusing error signal FE at the positive level (Level H); the comparison outputs of the focusing error signal FE at the negative level (Level L); the comparison outputs of the focusing error signal FE at the zero level (Level 0); and the comparison outputs of the sum signal SUM at the predetermined threshold (Threshold), as similarly shown in FIG. 10.

Referring to FIG. 11, in the case where a single-layer disk is used, during the forward movement, pulses P1 and P2 are supplied to the CPU 40 in that order so as to act as the polarity information of the focusing error signal FE. This means that, in the forward movement, the polarity of the focusing error signal FE is detected in the order positive→negative. In the backward movement, pulses P3 and P4 are supplied to the CPU 40 in that order so as to act as the polarity information of the focusing error signal FE. This means that, in the backward movement, the polarity of the focusing error signal FE is detected in the order negative→positive.

In other words, the number of appearances and the signal polarity are both different from those of the double-layer recording medium.

Because S-curves can be detected from the comparison results of parts (c) and (d) of FIG. 11 in both forward and backward movements, the focusing operation may begin in the vicinity of the zero-crossing point based on the detected pulses parts (c) and (d) of FIG. 11. In this case, the comparison outputs in part (f) of FIG. 11, in which the sum signal SUM level is above the constant threshold, are used to calculate the logical sum, whereby the execution of the focus control is ensured.

During the movement of the double objective lens (12 and 14), the CPU 40 determines the number of information-recording layer of the disk 11 based on the number of appearances of the polarity information. Furthermore, based on the number of appearances of the polarity information, the CPU 40 ensures a proper focusing operation on the target information-recording layer.

Because the actual focusing operation is generally performed when the disk 11 is being rotated, the detected signal is not always exactly as shown in FIGS. 10 and 11. In other words, the rotation of the disk may also cause the disk to move vertically, by which a focusing error signal may be generated. For this reason, the total number of signal outputs detected during the movement of the double objective lens (12 and 14) along the optical-axis may include some errors.

However, because the appearance of the polarities has a certain order, this embodiment ensures a proper focusing operation on a multilayer information-recording medium.

Figure 12:
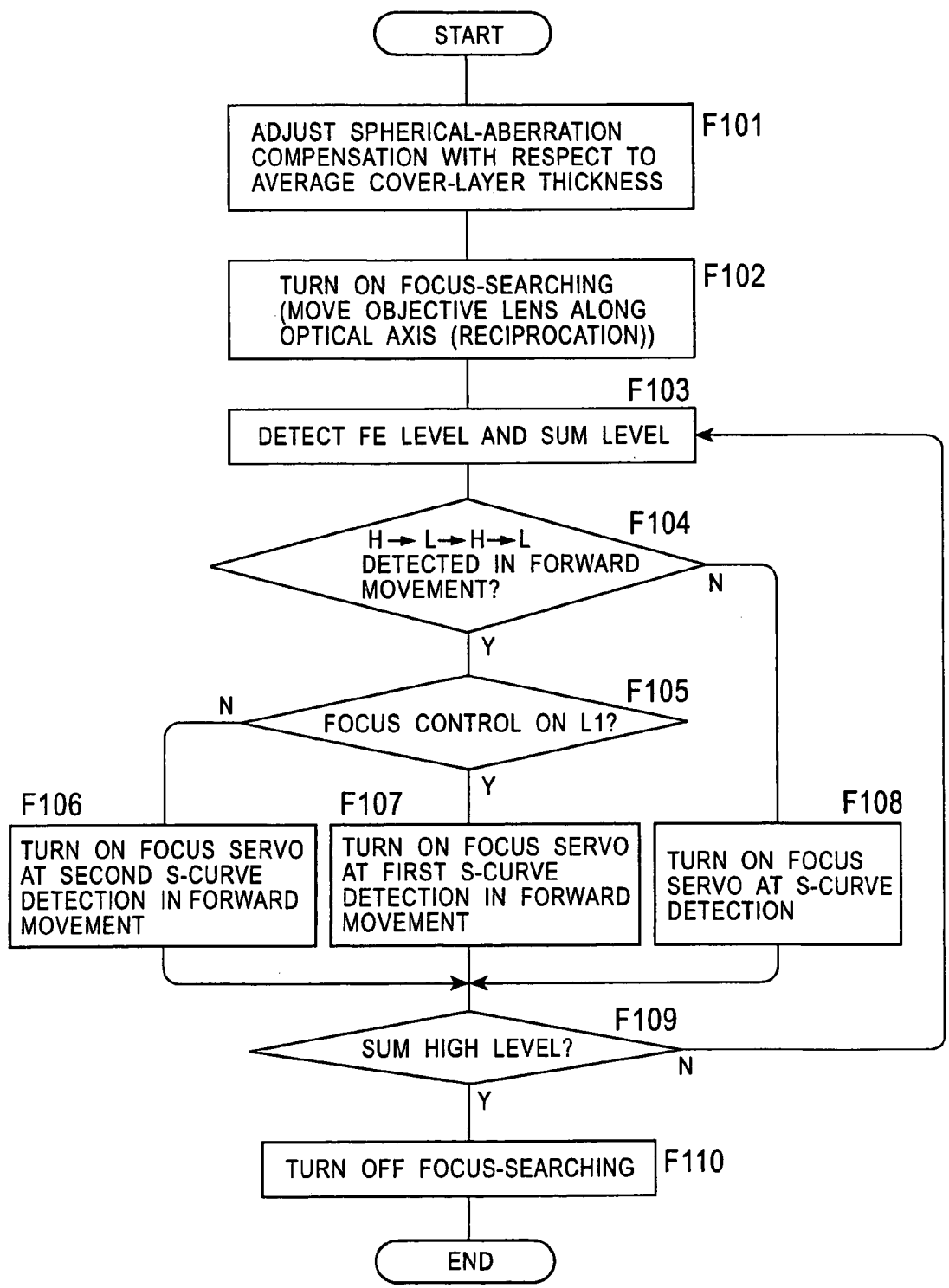
FIG. 12 is a flow chart of an operation of the first focus control according to the embodiment.

FIG. 12 is a flow chart describing an example of an operation of the CPU 40 in detail.

In step F101, the CPU 40 sends a command to the LCD controller 41 to set the amount of spherical-aberration compensation of the liquid crystal element 23 with respect to the average cover-layer thickness (for example, a cover-layer thickness of 87 μm).

In step F102, a command for starting the focus-searching operation is sent to the focus servo-controller 35. In other words, the double objective lens (12 and 14) is reciprocated along the optical axis. In step F103, the comparison-result information from the S-level detection circuit 34 and the comparison-result information of the sum signal SUM are detected. In other words, the comparison-result information of parts (c) to (f) of FIG. 10 or parts (c) to (f) of FIG. 11 is detected.

In response to the above detections, if the polarities in the order positive→negative→positive→negative are detected in the forward movement in step F104, the CPU 40 determines that the disk 11 is a double-layer disk. In this case, the process branches from step F105 depending on the target information-recording layer.

If the information-recording layer L1 is the target for the focus control, the operation proceeds to step F107 where the focusing operation is performed (focus servo ON), for example, in the vicinity of the zero-crossing point just after the detection of the first S-curve (positive-polarity detection) in the forward movement. In step F109, if the comparison-result information of the sum signal SUM is at Level H, the focusing is properly performed on the information-recording layer L1. In this case, the focus-searching operation is turned OFF in step F110 to terminate the operation.

If the information-recording layer L0 is the target for the focus control, the operation proceeds to step F106 where the focusing operation is performed (focus servo ON), for example, in the vicinity of the zero-crossing point just after the detection of the second S-curve (positive→negative→positive polarity detection) in the forward movement. In step F109, if the comparison-result information of the sum signal SUM is at Level H, the focusing is properly performed on the information-recording layer L0. In this case, the focus-searching operation is turned OFF in step F110 to terminate the operation.

If the polarities in the order positive→negative→positive→negative are not detected in the forward movement in step F104, the CPU 40 determines that the disk 11 is a single-layer disk. The operation then proceeds to step F108 where the focusing operation is performed (focus servo ON) in the vicinity of the zero-crossing point just after the detection of an S-curve. In step F109, if the comparison-result information of the sum signal SUM is at Level H, the focusing is properly performed on the information-recording layer L0 of the single-layer disk. In this case, the focus-searching operation is turned OFF in step F110 to terminate the operation.

On the other hand, if the comparison-result information of the sum signal SUM is at Level L in step F109, this means that the focusing is not properly performed on the target information-recording layer. Thus, the operation returns to step F103 to repeat the process over.

5. Second Focus Control

Second focus control will now be described.

In the first focus control, the set amount of spherical-aberration compensation is adjusted with respect to an average cover-layer thickness, and the focusing operation is performed selectively on multiple information-recording layers.

However, in a case where the interlayer distance between the information-recording layers of a double-layer disk is large, depending on the spherical aberrations caused, a focusing error signal FE for achieving a stable focusing operation as described above cannot always be obtained.

In other words, as shown in FIG. 8C, although the amplitude levels of the S-curves passing through the information-recording layers L1 and L0 are equivalent when the amount of spherical-aberration compensation is adjusted with respect to the average cover-layer thickness, the amplitude becomes smaller due to residual wavefront aberrations. This phenomenon of reduced amplitude is prominent especially when the interlayer distance is large. In some cases, the focusing error signal FE may show a waveform that is quite different from the shape of an S-curve.

In the second focus control and third focus control, which will be described later, the set amount of spherical-aberration compensation is preliminarily optimized with respect to the cover-layer thickness of a certain information-recording layer. This achieves a more stable focusing operation.

Figure 13:
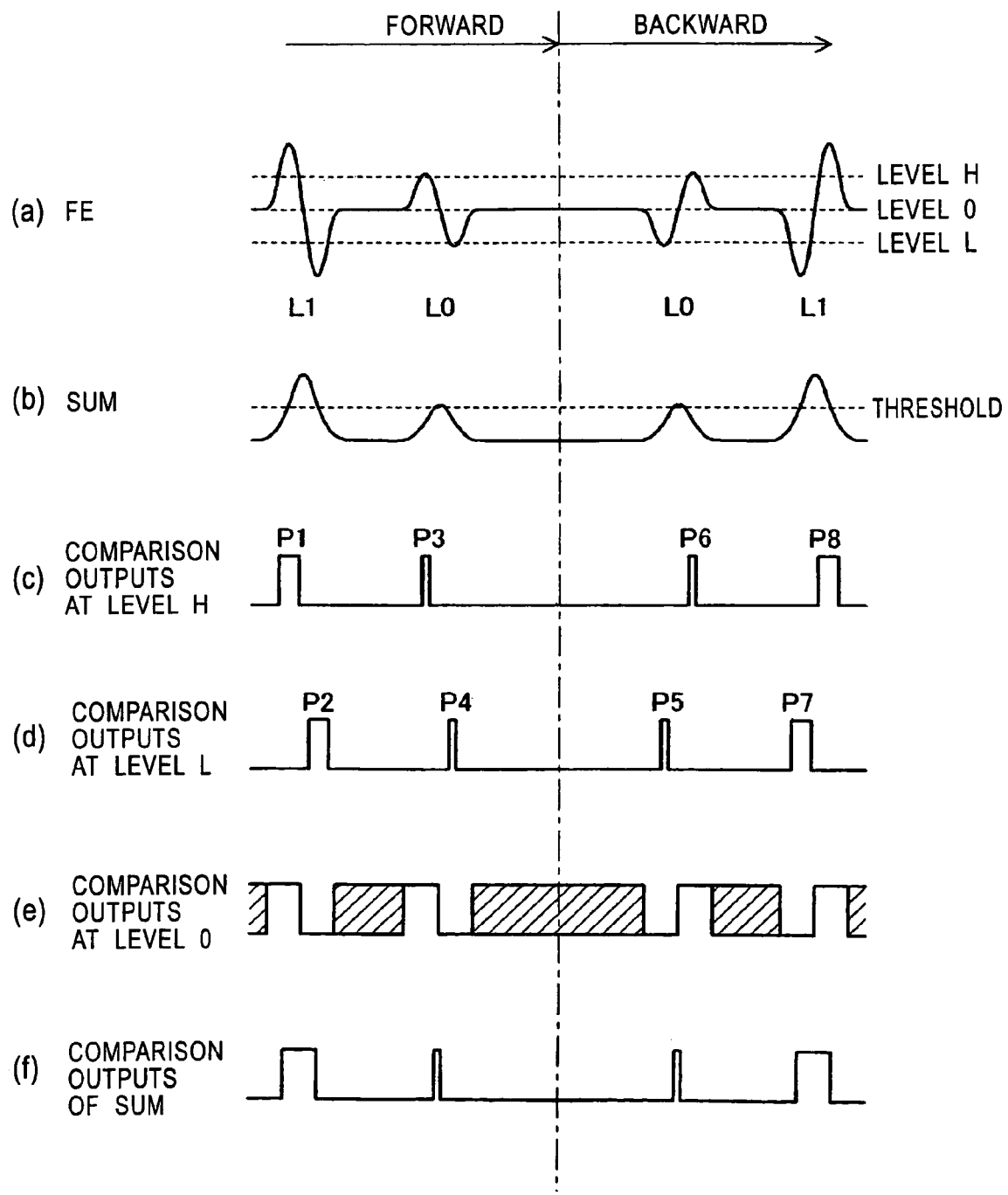
FIG. 13 schematically illustrates operation waveforms obtained during focusing on an L1 layer using second focus control according to the embodiment.

Parts (a) to (f) of FIG. 13 respectively show the focusing error signal FE; the sum signal SUM; the comparison outputs of the focusing error signal FE at the positive level (Level H); the comparison outputs of the focusing error signal FE at the negative level (Level L); the comparison outputs of the focusing error signal FE at the zero level (Level 0); and the comparison outputs of the sum signal SUM at the predetermined threshold (Threshold), as similarly shown in FIG. 10. Here, the double objective lens (12 and 14) is reciprocated along the optical axis with respect to a double-layer disk in a state where the set amount of the spherical-aberration compensation is preliminarily optimized with respect to the cover-layer thickness (75 μm) of the information-recording layer L1.

As is apparent from FIG. 8A, when the set amount of the spherical-aberration compensation is optimized with respect to the cover-layer thickness for the information-recording layer L1, an S-curve with large amplitude is observed as the laser-spot focus position is shifted through the information-recording layer L1, and an S-curve with smaller amplitude is observed as the laser-spot focus position is shifted through the information-recording layer L0.

In this case, in the forward movement, pulses P1, P2, P3, and P4 are supplied to the CPU 40 in that order to act as polarity information for the focusing error signal FE. In other words, the polarity of the focusing error signal FE is detected in the order positive→negative→positive→negative in the forward movement.

In comparison with an S-curve detected as a first pair of pulses P1 and P2, the amplitude of an S-curve detected as a second pair of pulses P3 and P4 is extremely small.

On the other hand, in the backward movement, pulses P5, P6, P7, and P8 are supplied to the CPU 40 in that order to act as polarity information for the focusing error signal FE. In other words, the polarity of the focusing error signal FE is detected in the order negative→positive→negative→positive in the backward movement.

In comparison with an S-curve detected as a second pair of pulses P7 and P8, the amplitude of an S-curve detected as a first pair of pulses P5 and P6 is extremely small.

Figure 15:
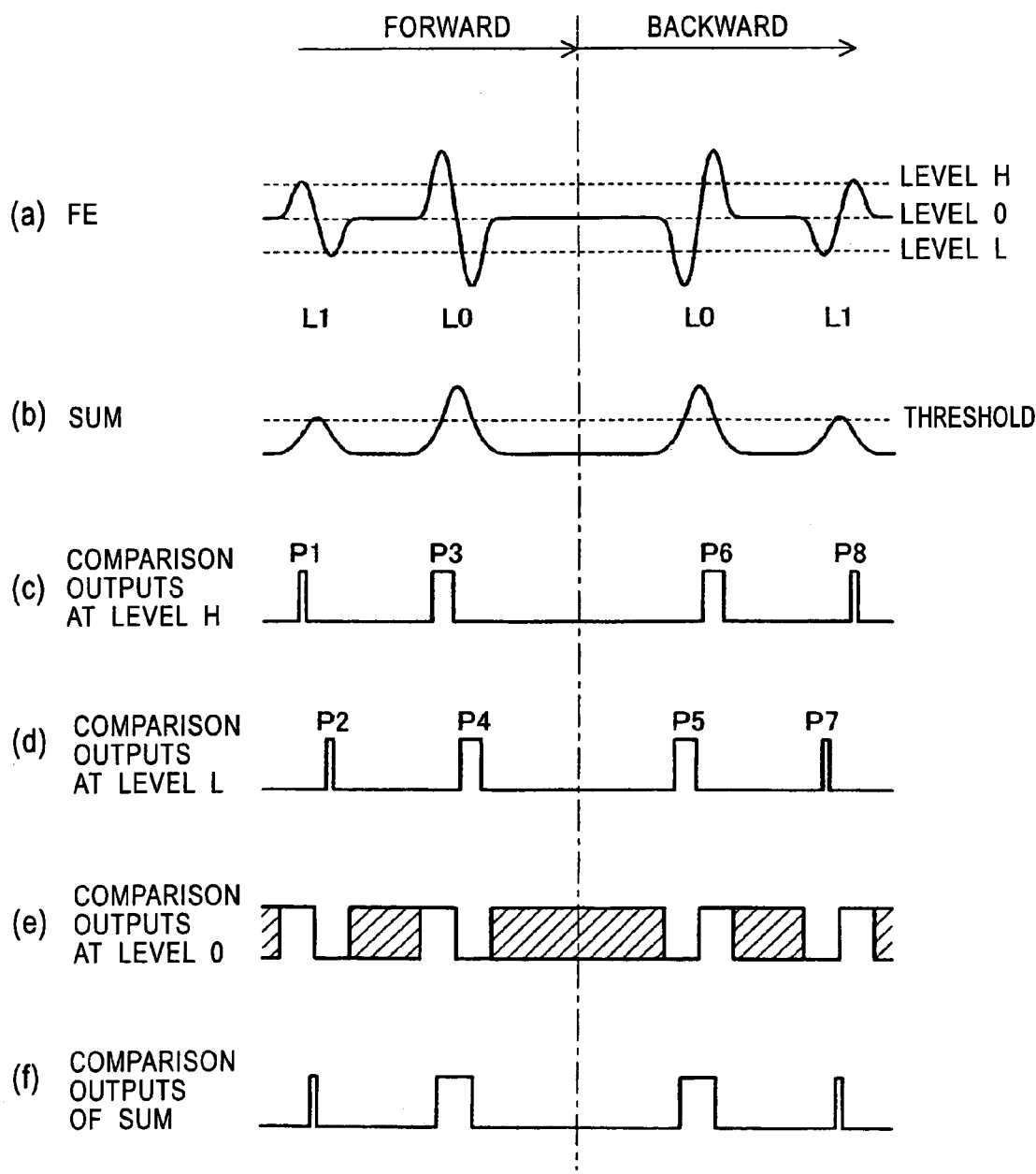
FIG. 15 schematically illustrates operation waveforms obtained during focusing on an L0 layer using the second focus control according to the embodiment.

Parts (a) to (f) of FIG. 15 respectively show the focusing error signal FE; the sum signal SUM; the comparison outputs of the focusing error signal FE at the positive level (Level H); the comparison outputs of the focusing error signal FE at the negative level (Level L); the comparison outputs of the focusing error signal FE at the zero level (Level 0); and the comparison outputs of the sum signal SUM at the predetermined threshold (Threshold), as similarly shown in FIG. 10. Here, the double objective lens (12 and 14) is reciprocated along the optical axis with respect to a double-layer disk in a state where the set amount of the spherical-aberration compensation is preliminarily optimized with respect to the cover-layer thickness (100 μm) of the information-recording layer L0.

As is apparent from FIG. 8B, when the set amount of the spherical-aberration compensation is optimized with respect to the cover-layer thickness of the information-recording layer L0, an S-curve with large amplitude is observed as the laser-spot focus position is shifted through the information-recording layer L0, and an S-curve with smaller amplitude is observed as the laser-spot focus position is shifted through the information-recording layer L1.

In the forward movement, pulses P1, P2, P3, and P4 are supplied to the CPU 40 in that order to act as polarity information for the focusing error signal FE. In other words, the polarity of the focusing error signal FE is detected in the order positive→negative→positive→negative in the forward movement.

However, in comparison with an S-curve detected as a second pair of pulses P3 and P4, the amplitude of an S-curve detected as a first pair of pulses P1 and P2 is extremely small.

On the other hand, in the backward movement, pulses P5, P6, P7, and P8 are supplied to the CPU 40 in that order as polarity information for the focusing error signal FE. In other words, the polarity of the focusing error signal FE is detected in the order negative→positive→negative→positive in the backward movement.

In comparison with an S-curve detected as a first pair of pulses P5 and P6, the amplitude of an S-curve detected as a second pair of pulses P7 and P8 is extremely small.

When performing the focusing operation on the information-recording layer L1, for example, a voltage applied to each of the electrodes of the liquid crystal element 23 is pre-adjusted to optimize the amount of spherical-aberration compensation with respect to the information-recording layer L1. The double objective lens (12 and 14) is then moved along the optical axis. The focusing operation begins in the vicinity of a zero-crossing point just after the first positive level (P1 of FIG. 13) of the detection result of the focusing error signal FE in the forward movement. In this case, by calculating the logical sum under the condition in which the sum signal SUM level is above the constant threshold, proper focus control on the information-recording layer L1 is ensured.

When performing the focusing operation on the information-recording layer L0, for example, a voltage applied to each of the electrodes of the liquid crystal element 23 is pre-adjusted to optimize the amount of spherical-aberration compensation with respect to the information-recording layer L0. The double objective lens (12 and 14) is then moved along the optical axis. The focusing operation begins in the vicinity of a zero-crossing point just after the first negative level (P5 of FIG. 15) of the detection result of the focusing error signal FE in the backward movement. In this case, by calculating the logical sum under the condition in which the sum signal level is above the constant threshold, proper focus control on the information-recording layer L0 is ensured.

Figure 14:
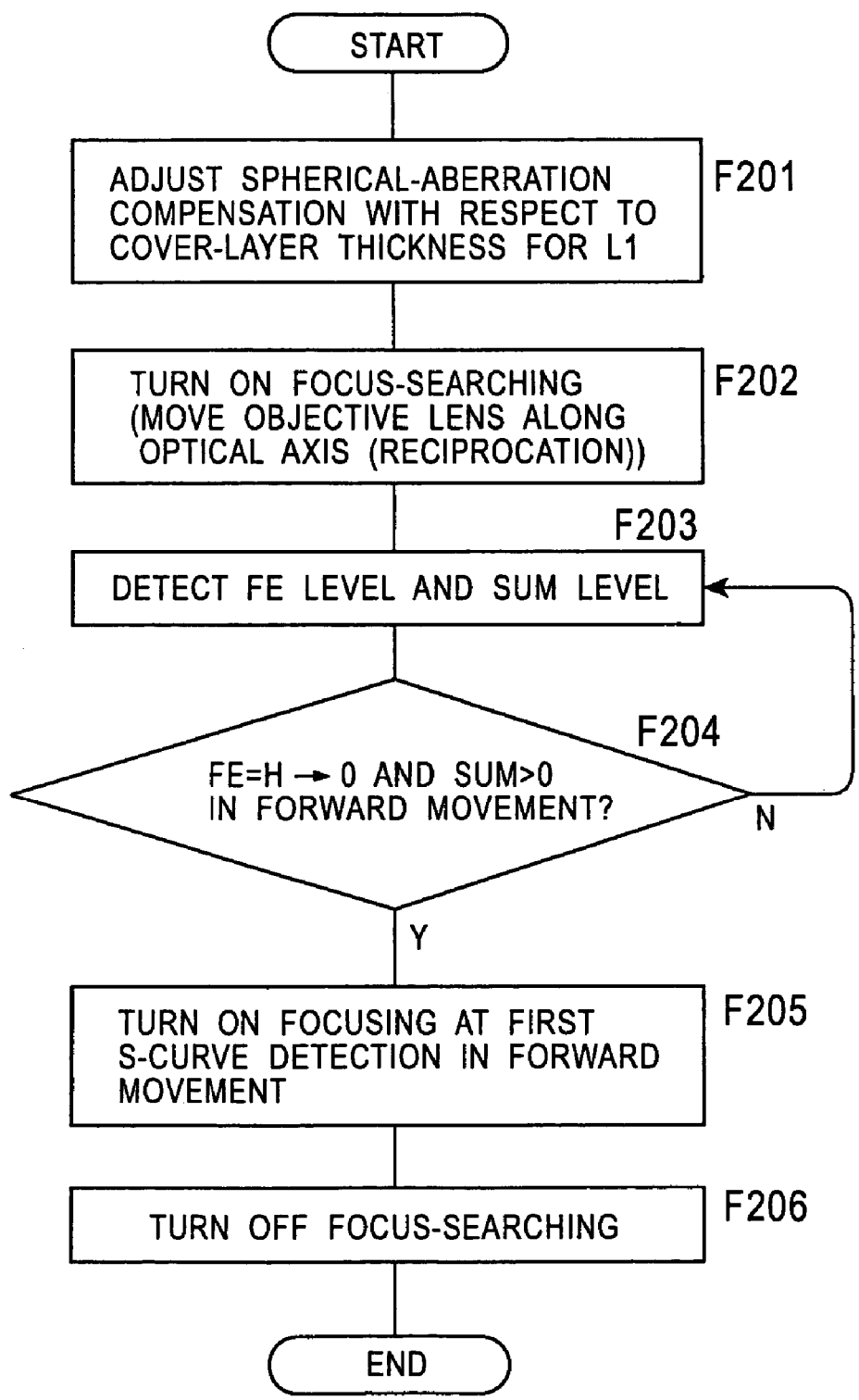
FIG. 14 is a flow chart of an operation in which the L1 layer is focused on using the second focus control according to the embodiment.

FIG. 14 describes an operation of the CPU 40 in a case where the focusing operation is performed on the information-recording layer L1.

In step F201, the CPU 40 sends a command to the LCD controller 41 to set the amount of spherical-aberration compensation of the liquid crystal element 23 with respect, to the cover-layer thickness (75 μm) of the information-recording layer L1.

In step F202, a command for starting the focus-searching operation is sent to the focus servo-controller 35. In other words, the double objective lens (12 and 14) is reciprocated along the optical axis. In step F203, the comparison-result information from the S-level detection circuit 34 and the comparison-result information of the sum signal SUM are detected. In other words, the comparison-result information of parts (c) to (f) of FIG. 13 is detected.

In step F204, a polarity change of the focusing error signal FE, i.e., positive→zero, in the forward movement is observed. Furthermore, the timing at which the comparison-result information of the sum signal SUM reaches Level H is monitored.

Because this timing is used as focusing timing for the information-recording layer L1, once the conditions where the polarity of the focusing error signal FE changes from positive to zero and where the comparison-result information of the sum signal SUM reaches Level H are met, the focusing operation is performed in step F205. This means that the focus servo is turned ON in the first S-curve of the forward movement. Consequently, the focusing is performed properly on the information-recording layer L1. In step F206, the focus-searching operation is turned OFF to terminate the operation.

Figure 16:
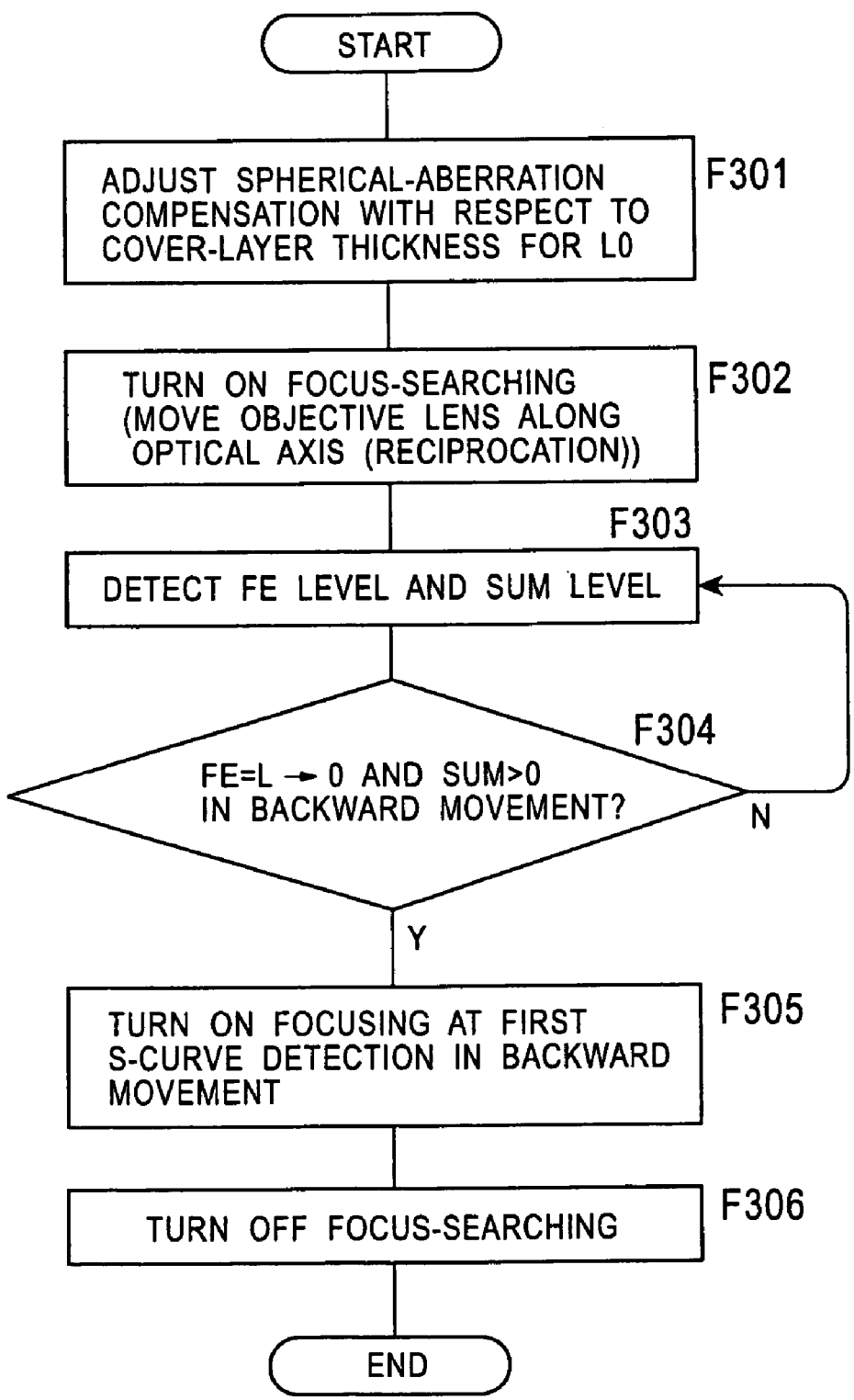
FIG. 16 is a flow chart of an operation in which the L0 layer is focused on using the second focus control according to the embodiment.

FIG. 16 describes the operation of the CPU 40 in a case where the focusing operation is performed on the information-recording layer L0.

In step F301, the CPU 40 sends a command to the LCD controller 41 to set the amount of spherical-aberration compensation of the liquid crystal element 23 with respect to the cover-layer thickness (100 μm) of the information-recording layer L0.

In step F302, a command for starting the focus-searching operation is sent to the focus servo-controller 35. In other words, the double objective lens (12 and 14) is reciprocated along the optical axis. In step F303, the comparison-result information from the S-level detection circuit 34 and the comparison-result information of the sum signal SUM are detected. In other words, the comparison-result information in parts (c) to (f) of FIG. 15 is detected.

In step F304, a polarity change of the focusing error signal FE, i.e., positive→zero, is observed in the backward movement. Furthermore, the timing at which the comparison-result information of the sum signal SUM reaches Level H is monitored.

Because this timing is used as focusing timing for the information-recording layer L0, once the conditions where the polarity of the focusing error signal FE changes from negative to zero and where the comparison-result information of the sum signal SUM reaches Level H are met, the focusing operation is performed in step F305. This means that the focus servo is turned ON in the first S-curve of the backward movement. Consequently, the focusing is performed properly on the information-recording layer L0. In step F306, the focus-searching operation is turned OFF to terminate the operation.

In the second focus control, the preliminary optimization of the set amount of the spherical-aberration compensation with respect to the target information-recording layer ensures satisfactory S-curves of the target information-recording layer, and the focusing operation is performed based on the polarity information.

Thus, proper focus control for the desired information-recording layer of a multilayer disk is achieved.

This is effective especially when playing back or recording on a multilayer optical disk having two or more information layers by using an objective lens with a high numerical aperture, such as the double objective lens (12 and 14). In particular, a stable focusing operation is achieved when using a multilayer optical disk having a large interlayer distance.

Because the actual focusing operation is generally performed when the optical-disk medium is being rotated, the detected signal may not always be exactly as shown in FIGS. 13 and 15. In other words, the rotation of the disk may also cause the disk to move vertically, by which a focusing error signal may also be generated. For this reason, the number of signal outputs detected during the movement of the double objective lens (12 and 14) along the optical-axis may include some errors. Furthermore, if the spherical-aberration compensation is not properly performed, the amplitude of the focusing error signal FE is reduced, and a desired S-curve cannot therefore be obtained. However, when the amount of spherical-aberration compensation is optimized with respect to a cover layer for the target information-recording layer for the focusing operation, a satisfactory S-curve can be obtained at least for that information-recording layer. Additionally, the appearance of the signal polarities has a certain order. For this reason, this embodiment ensures a proper focusing operation on the desired information-recording layer of a multilayer disk.

6. Third Focus Control

Third focus control will now be described.

Up to the point where the focusing operation is performed on the first information-recording layer, the third focus control is the same as the second focus control. The third focus control is a method of focus-jumping from the information-recording layer on which the focusing operation has been performed to another target information-recording layer, when it is desired to perform the focusing operation that target information-recording layer.

Figure 17:
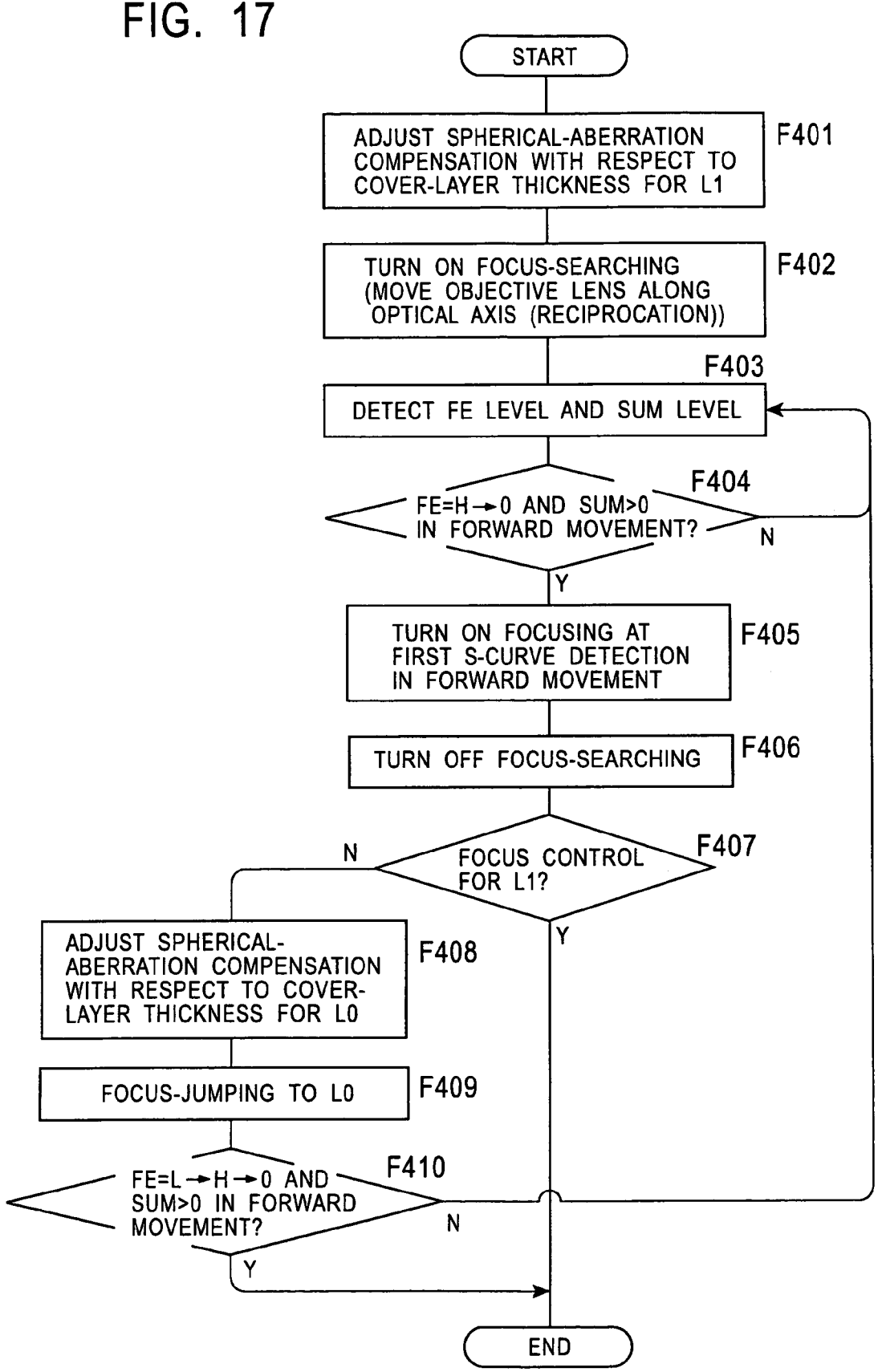
FIG. 17 is a flow chart of an operation of third focus control according to the embodiment.

FIG. 17 describes the operation of the CPU 40. Here, the focusing operation is first performed on the information-recording layer L1, and is then performed on the information-recording layer L0. In this case, focus-jumping is executed towards the information-recording layer L0 after the focusing operation on the information-recording layer L1.

Step F401 to step F406 of FIG. 17 are the same as step F201 to step F206 of FIG. 14.

Accordingly, the focusing operation on the information-recording layer L1 is completed in the process from step F401 to step F406.

The process branches from step F407 depending on the target information-recording layer. If the information-recording layer L1 is the target, the focusing operation is completed at this point. Thus, the operation is terminated in step F407.

On the other hand, if the information-recording layer L0 is the target, the process changes over to perform focus-jumping. In step F408, the CPU 40 sends a command to the LCD controller 41 to set the amount of spherical-aberration compensation of the liquid crystal element 23 with respect to the cover-layer thickness (100 µm) of the information-recording layer L0.

In step F409, a command for starting the focus-jumping operation is sent to the focus servo-controller 35. In other words, the double objective lens (12 and 14) is moved towards the information-recording layer L0 (in this case, in the forward direction).

In step F410, the comparison-result information from the S-level detection circuit 34 and the comparison-result information of the sum signal SUM are detected.

During the focus-jumping operation, because the set amount of the spherical-aberration compensation is optimized with respect to the cover-layer thickness for the information-recording layer L0 in step F408, the forward-movement curves observed have a waveform similar to those in FIG. 15.

In step F410, as a result of the focus-jumping operation, polarity changes of the focusing error signal FE in the forward movement in the order negative→positive→zero (i.e., P2→P3→zero-crossing point) is observed. Accurate jumping to the information-recording layer L0 is completed (completion of the focusing operation) when the comparison-result information of the sum signal SUM at Level H is confirmed. Thus, the operation ends.

In the third focus control, proper focus control for the desired information-recording layer of a multilayer disk is achieved. In addition, the shifting of a focal spot through the intermediate layer is readily achieved.

In the focus-jumping operation, because the setting of the spherical-aberration compensation is optimized with respect to the cover-layer thickness for an information-recording layer to which the focus-jumping is targeted, an S-curve with sufficient intensity can be obtained. Accordingly, an accurate jumping operation is achieved.

In step F408 of FIG. 17, the setting of the spherical-aberration compensation may be optimized with respect to the average (87 µm) of the cover-layer thicknesses of information-recording layers L1 and L2.

Although FIG. 17 describes an example of an operation in which the focusing operation is first performed on the information-recording layer L1 and then the jumping operation directed towards the information-recording layer L0 is performed, an alternative operation is also possible where the focusing operation is first performed on the information-recording layer L0 and then the jumping operation directed towards the information-recording layer L1 is performed.

7. Optimization after Focusing Operation

Generally, the compensation setting of a spherical-aberration compensator (liquid crystal element 23) is preset to the optimal amount for each information-recording layer. However, in an actual multilayer optical recording medium, different thicknesses may be found in the cover-layer for each recording layer due to errors in manufacturing.

Furthermore, because the spherical-aberration compensator itself has different amounts of compensation with respect to the applied voltage, a fine adjustment for optimizing the spherical-aberration compensation is desirable after the focusing operation is completed using the above methods.

In other words, after the focusing operation on the target information-recording layer, an optimization of the amount of spherical-aberration compensation according to a spherical-aberration error signal or a playback signal acting as reflected-beam information achieves stable recording and playback regardless of errors caused in the manufacturing of the recording medium.

In detail, an adjustment technique for optimizing the playback signal from the information-recording medium can be applied. For the adjustment, this technique uses, for example, the jitter value of a playback RF signal, which indicate fluctuation of the data edges of a playback clock (normally, a PLL clock in synchronization with playback data); the signal amplitude; or the error rate of playback data. For example, a technique described in Reference Document (7) may be applied.

Furthermore, as described in Reference Document (8), a method which uses an automatic compensation mechanism based on a spherical-aberration error signal generated by the returning-beam intensity from the recording medium is also applicable.

The technical scope of the present invention is not limited to the embodiments described above, and modifications are permissible within the scope and spirit of the present invention.

The focusing operation is described above with examples of a single-layer disk and a double-layer disk. Similarly, in an optical recording medium having three or more recording layers, by determining the number of appearances of the S-curves and also the signal polarity, a focusing operation on the target information-recording layer can be performed.

As described above, according to the present invention, when performing the focusing operation on the target information-recording layer of a recording medium, the spherical-aberration compensation is first adjusted with respect to the thickness of a transmissive protection layer (cover layer) for the target information-recording layer. Alternatively, the adjustment may be made with respect to the average thickness of transmissive protection layers for the corresponding multiple information-recording layers. An objective lens is then moved along the optical axis to perform a focus-searching operation. In that case, the polarity of the focusing error signal and the level of a reflected-beam intensity signal generated as reflected-beam information are observed so as to perform the focusing operation. Consequently, in an optical recording/playback apparatus for a recording medium having multiple information-recording layers, such as multilayer optical disks, a proper focusing operation on the target information-recording layer is achieved.

In particular, the present invention is advantageous when playing back or recording on a multilayer recording medium using an objective lens, such as a double lens, that has a high numerical aperture (of, for example, 0.85).

Furthermore, the detection of the polarities of the focusing error signal gives the number of S-curves generated when the objective lens moves along the optical axis and shifts the focal spot through information-recording layers. The number of information-recording layers of the recording medium can thus be detected.

Accordingly, even when an optical recording medium that is not held inside a cartridge, such as a bare disk, is used and a detection hole for differentiating between disk types cannot therefore be mechanically or optically detected, the number of information-recording layers can be determined based on the reflected beam from the optical recording medium.

By focus-searching in a state where the spherical-aberration compensation is adjusted with respect to the thickness of the transmissive protection layer (cover layer) for the target information-recording layer, proper focus control for any desired information-recording layer of a multilayer optical recording medium is achieved. Furthermore, the shifting of the focusing operation from one information-recording layer to another layer, that is, the interlayer shifting of the focal spot, is readily and properly achieved.

This is especially advantageous when playing back or recording on a multilayer optical-disk recording-medium having two or more information layers by using an objective lens, such as a double lens, that has a high numerical aperture (of, for example, 0.85). In particular, a stable focusing operation is achieved when using a multilayer optical-disk recording-medium having a large interlayer distance.

Furthermore, the optimization of the amount of spherical-aberration compensation based on a spherical-aberration error signal or a playback signal acting as reflected-beam information after performing the focusing operation on the target information-recording layer enables a stable recording and playback regardless of, for example, errors caused in the manufacturing of the recording medium.

The invention claimed is:

1. An optical recording/playback apparatus that records and plays back information by projecting a laser beam onto a recording medium having a single information-recording layer or multiple information-recording layers, comprising:

objective-lens means having a predetermined numerical aperture, the objective lens means being provided as an output end for the laser beam;

compensation optical means for compensating for spherical aberrations caused by the thickness of a transmissive protection layer provided for the information-recording layer of the recording medium;

moving means for moving the objective lens along the optical axis;

reflected-beam detecting means for detecting the laser beam reflected by the recording medium and for outputting reflected-beam information;

determination means for determining the polarity of a focusing error signal generated as the reflected-beam information and the level of a reflected-beam intensity signal generated as the reflected-beam information; and focus control means for performing a focusing operation based on the determination information from the determination means by using the moving means to move the objective-lens means along the optical axis in a state where the compensation optical means is optimized with respect to the thickness of a certain transmissive protection layer, wherein the focus control means performs the focusing operation on the target information-recording layer based on the direction in which the objective-lens means is moved by the moving means and based on the order of occurrences of the polarity information of the focusing error signal obtained by the determination means.

2. The optical recording/playback apparatus according to claim 1, wherein the objective-lens means has a numerical aperture of at least 0.8.

3. The optical recording/playback apparatus according to claim 1, wherein the determination means outputs a comparison result of the thresholds of the focusing error signal at a predetermined positive level and a predetermined negative level, the comparison result acting as the polarity information of the focusing error signal.

4. The optical recording/playback apparatus according to claim 1, wherein the focus control means performs the focusing operation on the target information-recording layer based on the direction in which the objective-lens means is moved by the moving means and based on the order and the number of occurrences of the polarity information of the focusing error signal obtained by the determination means.

5. The optical recording/playback apparatus according to claim 1, wherein the focus control means substantially adjusts the setting of the compensation optical means with respect to an average thickness of transmissive protection layers provided for the corresponding multiple information-recording layers of the recording medium, the average thickness acting as the thickness of the certain transmissive protection layer.

6. The optical recording/playback apparatus according to claim 1, wherein the focus control means adjusts the setting of the compensation optical means with respect to the thickness of a transmissive protection layer for one of the multiple information-recording layers of the recording medium, the information-recording layer being targeted for the focusing operation, the thickness of the transmissive protection layer acting as the thickness of the certain transmissive protection layer.

7. The optical recording/playback apparatus according to claim 1, wherein, in a case where the focusing operation is performed on one of the multiple information-recording layers of the recording medium and is then performed on another information-recording layer, the focus control means performs the focusing operation on said another information-recording layer based on the determination information from the determination means by using the moving means to move the objective-lens means along the optical axis in a state where the compensation optical means is optimized with respect to the thickness of the certain transmissive protection layer.

8. The optical recording/playback apparatus according to claim 7, wherein the focus control means adjusts the setting of the compensation optical means with respect to the thickness of a transmissive protection layer for said another information-recording layer, the thickness of the transmissive protection layer acting as the thickness of the certain transmissive protection layer.

9. The optical recording/playback apparatus according to claim 7, wherein the focus control means substantially adjusts the setting of the compensation optical means with respect to an average thickness of transmissive protection layers each provided for said one information-recording layer and said another information-recording layer, the average thickness acting as the thickness of the certain transmissive protection layer.

10. The optical recording/playback apparatus according to claim 1, further comprising optimization means for optimizing the amount of compensation of the compensation optical means in response to a playback signal or a spherical-aberration error signal after performing the focusing operation on the target information-recording layer, the playback signal and the spherical-aberration error signal acting as the reflected-beam information.

11. A focus-control method for performing a focusing operation on a target information-recording layer in an optical recording/playback apparatus that records and plays back information by projecting a laser beam onto a recording medium having a single information-recording layer or multiple information-recording layers, comprising:
  adjusting the setting of compensation optical means for optimization with respect to the thickness of a certain transmissive protection layer, the compensation optical means being provided for compensating for spherical aberrations caused by the thickness of the transmissive protection layer for the information-recording layer of the recording medium;
  determining the polarity of a focusing error signal and the level of a reflected-beam intensity signal while moving an objective lens having a predetermined numerical aperture along the optical axis, the focusing error signal being obtained as reflected-beam information of the laser beam from the recording medium, the reflected-beam intensity signal being generated as the reflected-beam information, the objective lens being provided as an output end for the laser beam; and
  performing the focusing operation based on the determination information obtained by the determination,
  wherein the focusing operation is performed on the target information-recording layer based on the moving direction of the objective lens and based on the order of occurrences of the polarity information of the focusing error signal obtained by the determination.

12. The focus-control method according to claim 11, wherein the objective lens has a numerical aperture of at least 0.8.

13. The focus-control method according to claim 11, wherein the polarity of the focusing error signal is determined by comparing the thresholds of the focusing error signal at a predetermined positive level and a predetermined negative level, and the comparison result acts as the determination information for the polarity of the focusing error signal.

14. The focus-control method according to claim 11, wherein the focusing operation is performed on the target information-recording layer based on the moving direction of the objective lens and based on the order and the number of occurrences of the polarity information of the focusing error signal obtained by the determination.

15. The focus-control method according to claim 11, wherein the compensation optical means is substantially adjusted with respect to an average thickness of transmissive protection layers for the corresponding multiple information-recording layers of the recording medium, the average thickness acting as the thickness of the certain transmissive protection layer.

16. The focus-control method according to claim 11, wherein the compensation optical means is adjusted with respect to the thickness of a transmissive protection layer for one of the multiple information-recording layers of the recording medium, the information-recording layer being targeted for the focusing operation, the thickness of the transmissive protection layer acting as the thickness of the certain transmissive protection layer.

17. The focus-control method according to claim 11, wherein, in a case where the focusing operation is performed on one of the multiple information-recording layers of the recording medium and is then performed on another information-recording layer, the method further comprises:
  moving the objective lens in a state where the setting of the compensation optical means is optimized with respect to the thickness of the certain transmissive protection layer;
  determining the polarity of a focusing error signal and the level of a reflected-beam intensity signal, the focusing error signal being obtained as reflected-beam information of the laser beam from the recording medium, the reflected-beam intensity signal being generated as the reflected-beam information; and
  performing the focusing operation on said another information-recording layer based on the determination information obtained by the determination.

18. The focus-control method according to claim 17, wherein the compensation optical means is adjusted with respect to the thickness of a transmissive protection layer for said another information-recording layer, the thickness of the transmissive protection layer acting as the thickness of the certain transmissive protection layer.

19. The focus-control method according to claim 17, wherein the compensation optical means is substantially adjusted with respect to an average thickness of transmissive protection layers each provided for said one information-recording layer and said another information-recording layer, the average thickness acting as the thickness of the certain transmissive protection layer.

20. The focus-control method according to claim 11, further comprising optimizing the amount of compensation of the compensation optical means in response to a playback signal or a spherical-aberration error signal after performing the focusing operation on the target information-recording layer, the playback signal and the spherical-aberration error signal acting as the reflected-beam information.

* * * * *